(12) United States Patent
Chen et al.

(10) Patent No.: US 12,360,376 B2
(45) Date of Patent: Jul. 15, 2025

(54) OPTICAL LENS ASSEMBLY AND HEAD-MOUNTED ELECTRONIC DEVICE

(71) Applicant: NEWMAX TECHNOLOGY CO., LTD., Taichung (TW)

(72) Inventors: Ping-Yi Chen, Taichung (TW); Fei-Hsin Tsai, Taichung (TW); Cong Ge, Guangdong Province (CN)

(*) Notice: Subject to any disclaimer, the term of this patent is extended or adjusted under 35 U.S.C. 154(b) by 0 days.

(21) Appl. No.: 18/198,820

(22) Filed: May 17, 2023

(65) Prior Publication Data

US 2024/0288692 A1 Aug. 29, 2024

(30) Foreign Application Priority Data

Feb. 24, 2023 (TW) ................. 112106851

(51) Int. Cl.
| | |
|---|---|
| *G02B 27/01* | (2006.01) |
| *G02B 5/30* | (2006.01) |
| *G02B 9/06* | (2006.01) |
| *G02B 13/00* | (2006.01) |

(52) U.S. Cl.
CPC ....... *G02B 27/0172* (2013.01); *G02B 5/3083* (2013.01); *G02B 9/06* (2013.01); *G02B 13/0035* (2013.01)

(58) Field of Classification Search
CPC .... G02B 27/0172; G02B 5/3083; G02B 9/06; G02B 13/0035
See application file for complete search history.

(56) References Cited

U.S. PATENT DOCUMENTS

| | | | | |
|---|---|---|---|---|
| 6,353,508 | B1* | 3/2002 | Burke | G02B 3/08 359/457 |
| 7,002,751 | B2* | 2/2006 | Kobayashi | G02B 27/0172 359/633 |
| 9,690,097 | B2* | 6/2017 | Tang | G02B 27/0172 |
| 9,759,915 | B2* | 9/2017 | Tang | G02B 27/0101 |
| 10,120,192 | B2* | 11/2018 | Li | G02B 27/01 |
| 10,185,148 | B2* | 1/2019 | Li | G02B 27/01 |
| 10,324,292 | B2* | 6/2019 | Li | G02B 27/10 |
| 10,606,095 | B2* | 3/2020 | Takagi | G02B 17/086 |
| 10,712,569 | B2* | 7/2020 | Jiang | G02B 27/106 |
| 11,204,500 | B2* | 12/2021 | Takagi | G02B 27/0101 |
| 11,604,349 | B2* | 3/2023 | Li | G02B 27/0025 |
| 11,803,062 | B1* | 10/2023 | Huang | G02B 9/12 |
| 12,013,553 | B2* | 6/2024 | Yamada | G02B 5/08 |
| 12,032,167 | B2* | 7/2024 | Sato | G02B 27/0172 |
| 12,135,431 | B2* | 11/2024 | Yamada | G02B 27/0172 |

(Continued)

*Primary Examiner* — Michael J Jansen, II
(74) *Attorney, Agent, or Firm* — Bruce Stone LLP; Joseph A. Bruce

(57) ABSTRACT

An optical lens assembly includes, in order from a visual side to an image source side: an optical element including, in order from the visual side to the image source side: an absorptive polarizer, a reflective polarizer and a phase retarder; a first lens with refractive power, and an image source-side surface of the first lens being convex in a paraxial region thereof; and a second lens with refractive power, and a visual-side surface of the second lens being concave in a paraxial region thereof and provided with a partial-reflective-partial-transmissive element. The optical element is disposed on a visual-side surface of the first lens. The optical lens assembly may become lightweight and have good image quality when satisfying a specific condition.

15 Claims, 10 Drawing Sheets

(56) References Cited

U.S. PATENT DOCUMENTS

| | | | | |
|---|---|---|---|---|
| 2002/0057498 A1* | 5/2002 | Kobayashi | G02B 27/0172 | 359/629 |
| 2004/0014504 A1* | 1/2004 | Coates | G02B 27/281 | 455/566 |
| 2007/0273970 A1* | 11/2007 | Hoppe | G02B 27/28 | 359/489.18 |
| 2017/0017077 A1* | 1/2017 | Tang | G02B 27/283 | |
| 2017/0017078 A1* | 1/2017 | Tang | G02B 5/003 | |
| 2018/0088332 A1* | 3/2018 | Li | G06T 3/047 | |
| 2018/0088333 A1* | 3/2018 | Li | G02B 27/0012 | |
| 2018/0120564 A1* | 5/2018 | Li | G02B 27/14 | |
| 2019/0033581 A1* | 1/2019 | Li | G02B 27/0172 | |
| 2019/0049733 A1* | 2/2019 | Jiang | G02B 17/0856 | |
| 2019/0079234 A1* | 3/2019 | Takagi | G02B 27/0101 | |
| 2019/0265466 A1* | 8/2019 | Yun | G02B 27/0081 | |
| 2019/0265494 A1* | 8/2019 | Takagi | G02B 27/286 | |
| 2019/0346918 A1* | 11/2019 | Akkaya | G02B 27/0075 | |
| 2023/0022744 A1* | 1/2023 | Sato | G02F 1/133504 | |
| 2023/0143390 A1* | 5/2023 | Chen | G02B 17/08 | 359/362 |
| 2023/0273452 A1* | 8/2023 | Yamada | G02B 30/56 | 345/173 |
| 2023/0341659 A1* | 10/2023 | Chen | G02B 13/0065 | |
| 2023/0341697 A1* | 10/2023 | Chen | G02B 27/28 | |
| 2023/0384594 A1* | 11/2023 | Hong | G02B 17/0856 | |
| 2023/0400694 A1* | 12/2023 | Yamada | G02B 5/3083 | |
| 2024/0027731 A1* | 1/2024 | Chen | G06F 1/163 | |
| 2024/0036342 A1* | 2/2024 | Ouderkirk | G02B 5/09 | |
| 2024/0176116 A1* | 5/2024 | Chen | G02B 13/004 | |
| 2024/0288692 A1* | 8/2024 | Chen | G02B 5/3083 | |
| 2024/0345380 A1* | 10/2024 | Chen | G02B 25/001 | |
| 2024/0369837 A1* | 11/2024 | Chen | G02B 9/12 | |
| 2024/0377623 A1* | 11/2024 | Chen | G02B 5/30 | |
| 2025/0013025 A1* | 1/2025 | Chen | G02B 17/0856 | |

* cited by examiner

OPTICAL LENS ASSEMBLY AND HEAD-MOUNTED ELECTRONIC DEVICE

BACKGROUND

Field of the Invention

The present invention relates to an optical lens assembly and head-mounted electronic device, and more particularly to an optical lens assembly applicable to head-mounted electronic devices.

Description of Related Art

With the development of the semiconductor industry, the functions of various consumer electronic products are increasingly powerful. Moreover, various services of the software application end emerge. These enable consumers to have more choices. Virtual reality (VR) technology emerges when the market is no longer satisfied with handheld electronic products. Nowadays, the application of virtual reality opens up a blue ocean market for consumer electronics, and in the application field of virtual reality, the first commercialized project is the head-mounted display.

However, the current head-mounted displays are heavy and have poor image quality.

The present invention mitigates and/or obviates the aforementioned disadvantages.

SUMMARY

The objective of the present invention is to provide an optical lens assembly and a head-mounted electronic device, which can reduce the number of lenses by folding the light path, so as to reduce the weight of the device, and also can provide better image quality.

Therefore, an optical lens assembly in accordance with an embodiment of the present invention includes, in order from a visual side to an image source side: an optical element including, in order from the visual side to the image source side: an absorptive polarizer, a reflective polarizer and a phase retarder (i.e., a first phase retarder); a first lens with refractive power, and an image source-side surface of the first lens being convex in a paraxial region thereof; and a second lens with refractive power, and a visual-side surface of the second lens being concave in a paraxial region thereof and provided with a partial-reflective-partial-transmissive element. The optical element is disposed on a visual-side surface of the first lens.

In the optical lens assembly, a focal length of the optical lens assembly is f, a maximum image source height of the optical lens assembly is IMH, a distance from a visual-side surface of the absorptive polarizer to the image source plane along an optical axis is TL, a maximum effective radius of the image source-side surface of the first lens is CA2, an absolute value of a displacement in parallel to the optical axis from an intersection between the image source-side surface of the first lens and the optical axis to the maximum effective radius position on the image source-side surface of the first lens is TDP2, and at least one of the following conditional formulas are satisfied: 8.32 mm<f*IMH/TL<38.92 mm; and 3.18<CA2/TDP2<7.59. When f*IMH/TL is satisfied, a proper balance between the miniaturization of the optical lens assembly and the size of the light-emitting area of a display can be achieved. When CA2/TDP2 is satisfied, the formability of the first lens can be enhanced.

Optionally, the focal length of the optical lens assembly is f, the maximum image source height of the optical lens assembly is IMH, and the following conditional formula is satisfied: 0.55<IMH/f<1.03, which is conducive to providing a wide visual angle while satisfying the image resolution.

Optionally, the focal length of the optical lens assembly is f, a focal length of the first lens is f1, and the following conditional formula is satisfied: 0.15<f/f1<0.38, which is conducive to enhancing the wide-angle characteristic of the optical lens assembly through the ratio of the focal length of the first lens to the focal length of the optical lens assembly, thereby providing a larger field of view and maintaining the illumination of the optical lens assembly.

Optionally, the focal length of the first lens is f1, a focal length of the second lens is f2, and the following conditional formula is satisfied: −1.77<f1/f2<3.56, which is conducive to achieving the more appropriate distribution of the refractive power of the optical lens assembly, thereby reducing the aberration.

Optionally, a radius of curvature of the visual-side surface of the second lens is R3, a radius of curvature of an image source-side surface of the second lens is R4, and the following conditional formula is satisfied: −2.68<R3/R4<6.25, which is conducive to reducing the sensitivity to the assembly tolerance as the two radii of curvature are conditioned by each other.

Optionally, a thickness of the first lens along the optical axis is CT1, a thickness of the second lens along the optical axis is CT2, and the following conditional formula is satisfied: 0.34<CT1/CT2<4.48, which can reduce the length of the optical lens assembly and provide a better image quality.

Optionally, a radius of curvature of the image source-side surface of the first lens is R2, the radius of curvature of an image source-side surface of the second lens is R4, and the following conditional formula is satisfied: −0.93<R2/R4<4.30, which is conducive to reducing the sensitivity to the assembly tolerance as the two radii of curvature are conditioned by each other.

Optionally, the focal length of the second lens is f2, the radius of curvature of the visual-side surface of the second lens is R3, and the following conditional formula is satisfied: −2.83<R3/f2<2.17, which is conducive to improving the distortion of the optical lens assembly, reducing the aberration of the optical lens assembly, and reducing the size of the lens more.

Optionally, the radius of curvature of the image source-side surface of the first lens is R2, the thickness of the first lens along the optical axis is CT1, and the following conditional formula is satisfied: −13.20<R2/CT1<−2.43, which is conducive to achieving a proper balance between the radius of curvature and the thickness of the first lens, thereby enhancing the lens formability.

Optionally, a distance from the image source-side surface of the second lens to the image source plane along the optical axis is BFL, the thickness of the second lens along the optical axis is CT2, and the following conditional formula is satisfied: 0.07<BFL/CT2<7.75, which is conducive to achieving a proper balance between the lens formability and the refractive power of the second lens.

Optionally, a distance from the first lens to the second lens along the optical axis is T12, the distance from the image source-side surface of the second lens to the image source plane along the optical axis is BFL, and the following conditional formula is satisfied: 0.02<T12/BFL<8.54, which is conducive to maintaining a proper spacing between the lenses, thereby reducing the assembly tolerance and reducing the sensitivity of the lens assembly.

Optionally, a maximum effective radius of the image source-side surface of the second lens is CA4, an absolute value of a displacement in parallel to the optical axis from an intersection between the image source-side surface of the second lens and the optical axis to the maximum effective radius position on the image source-side surface of the second lens is TDP4, and the following conditional formula is satisfied: $2.70<CA4/TDP4<31.03$, which is conducive to enhancing the formability of the second lens.

Optionally, the maximum effective radius of the image source-side surface of the first lens is CA2, the thickness of the first lens along the optical axis is CT1, and the following conditional formula is satisfied: $1.29<CA2/CT1<5.46$, which is conducive to enhancing the formability of the first lens.

Optionally, the maximum effective radius of the image source-side surface of the second lens is CA4, the thickness of the second lens along the optical axis is CT2, and the following conditional formula is satisfied: $1.04<CA4/CT2<14.93$, which is conducive to enhancing the formability of the second lens.

Optionally, the focal length of the optical lens assembly is f, the focal length of the second lens is f2, and the following conditional formula is satisfied: $-0.41<f/f2<0.66$, which is conducive to enhancing the wide-angle characteristic of the optical lens assembly through the ratio of the focal length of the second lens to the focal length of the optical lens assembly, thereby providing a larger field of view and maintaining the illumination of the optical lens assembly.

Optionally, the radius of curvature of the image source-side surface of the first lens is R2, the radius of curvature of the visual-side surface of the second lens is R3, and the following conditional formula is satisfied: $0.30<R2/R3<0.83$, which is conducive to preventing the radii of curvature from being too small and to reducing the sensitivity to the assembly tolerance as the two radii of curvature are conditioned by each other.

Optionally, the focal length of the first lens is f1, the radius of curvature of the image source-side surface of the first lens is R2, and the following conditional formula is satisfied: $-0.55<R2/f1<-0.43$, which is conducive to improving the distortion of the optical lens assembly, reducing the aberration of the optical lens assembly, and reducing the size of the lens.

Optionally, the focal length of the second lens is f2, the radius of curvature of an image source-side surface of the second lens is R4, and the following conditional formula is satisfied: $-1.03<R4/f2<1.37$, which is conducive to effectively reducing the curvature of field, enhancing the image quality of the optical lens assembly, and ensuring the lens formability.

Optionally, the first lens has positive refractive power.

Optionally, the visual-side surface of the first lens is flat in a paraxial region thereof.

Optionally, the focal length of the optical lens assembly is f, and the following conditional formula is satisfied: $15.07 \text{ mm}<f<38.73 \text{ mm}$.

Optionally, the distance from the visual-side surface of the absorptive polarizer to the image source plane along the optical axis is TL, and the following conditional formula is satisfied: $16.59 \text{ mm}<TL<32.52 \text{ mm}$.

Optionally, the maximum image source height of the optical lens assembly is IMH, and the following conditional formula is satisfied: $11.25 \text{ mm}<IMH<29.96 \text{ mm}$.

Moreover, a head-mounted electronic device in accordance with an embodiment of the present invention includes a housing, the aforementioned optical lens assembly disposed in the housing, an image source disposed on the image source plane of the optical lens assembly in the housing, and a controller disposed in the housing and electrically connected to the image source.

The present invention will be presented in further details from the following descriptions with the accompanying drawings, which show, for purpose of illustrations only, the preferred embodiments in accordance with the present invention.

DETAILED DESCRIPTION

First Embodiment

Figure 1A:
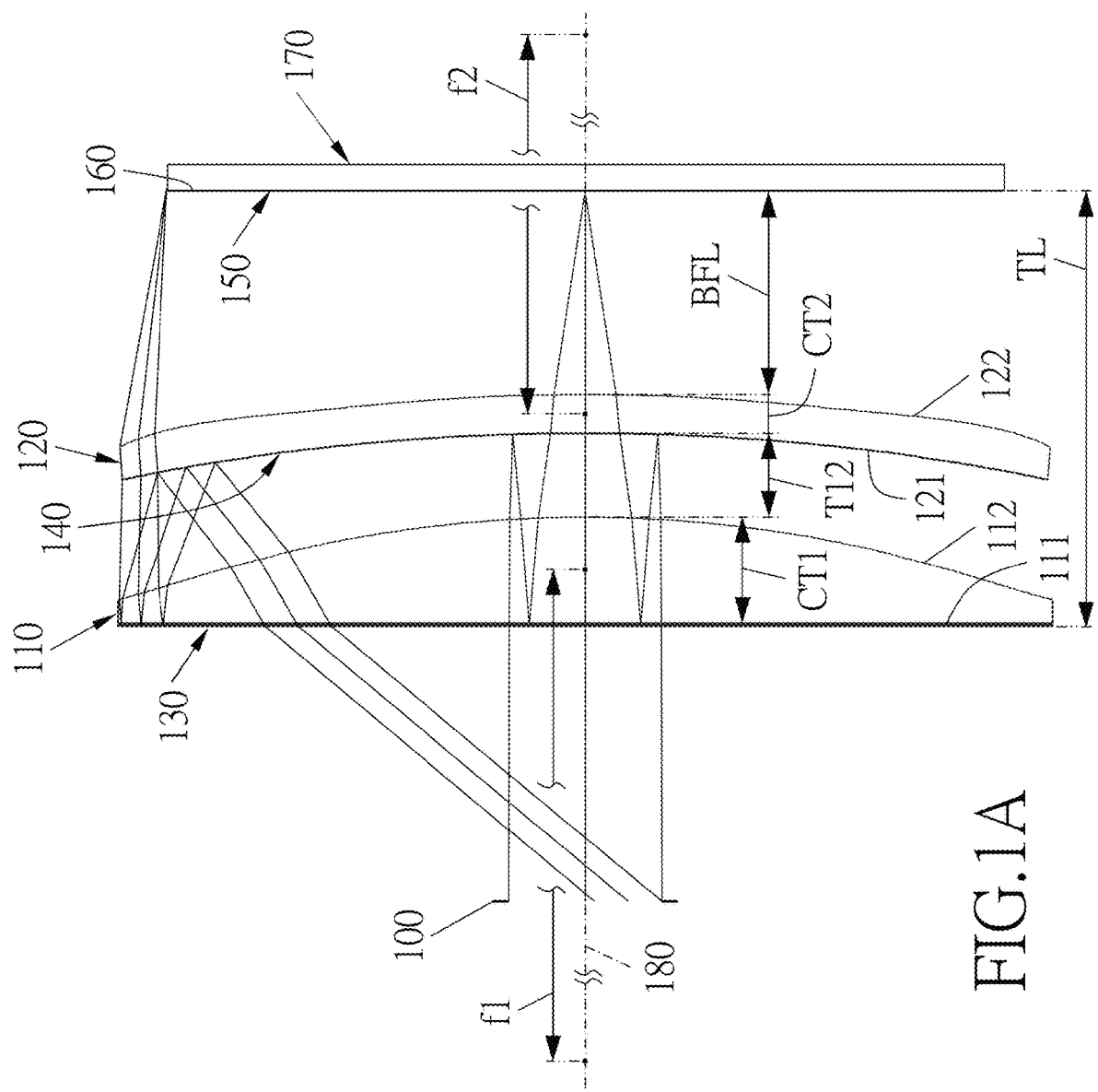
FIG. 1A is a schematic view of an optical lens assembly in accordance with a first embodiment of the present invention.
Figure 1B:
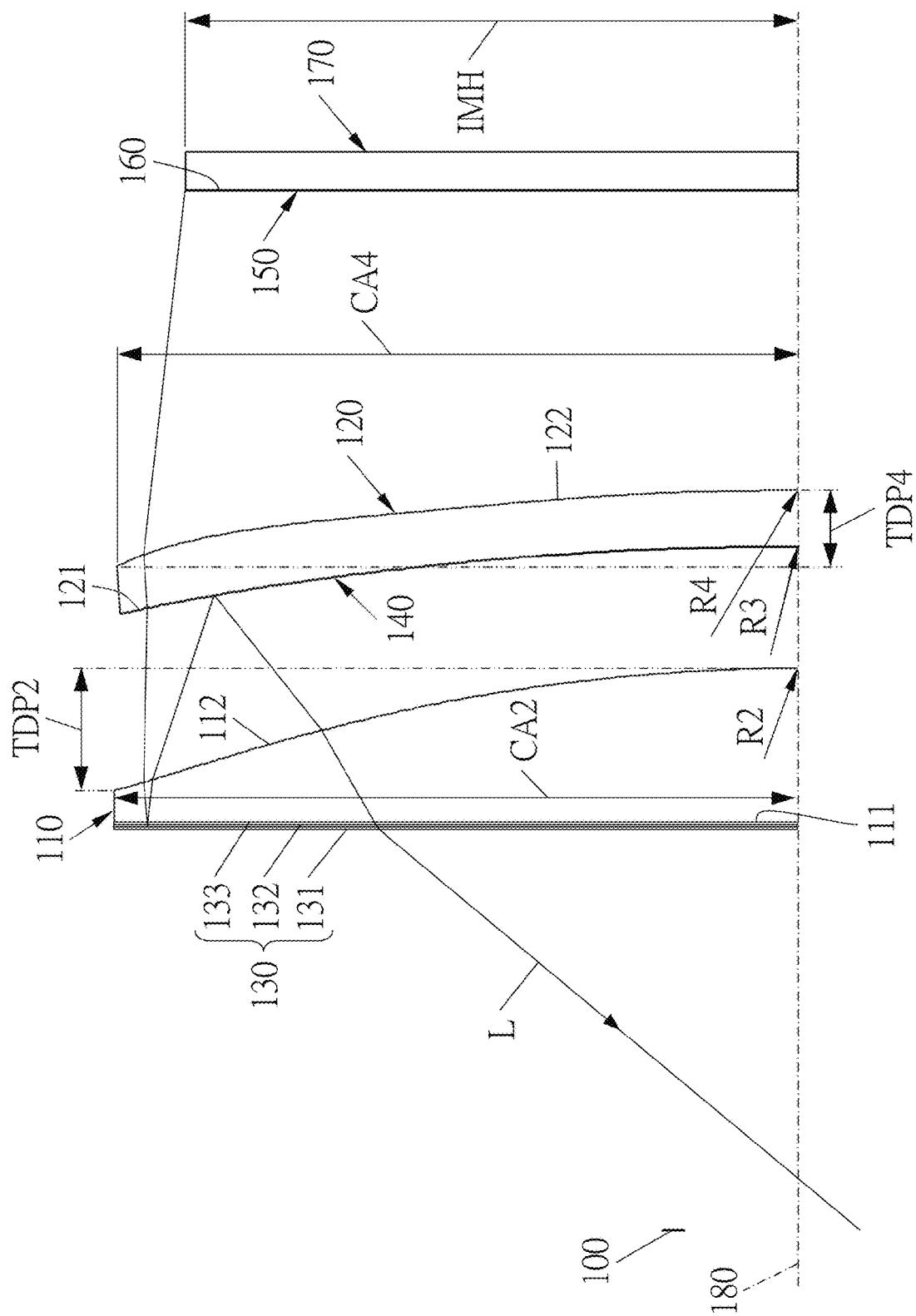
FIG. 1B is a schematic diagram of a part of the optical lens assembly of FIG. 1A with a light path of a chief ray therein.

Referring to FIGS. 1A and 1B, an optical lens assembly in accordance with a first embodiment of the present invention includes, in order from a visual side to an image source side along an optical axis 180: a stop 100, an optical element 130, a first lens 110, a partial-reflective-partial-transmissive element 140, a second lens 120, a second phase retarder 150 and an image source plane 160. The optical lens assembly has a total of two lenses with refractive power, but not is limited thereto.

The stop 100 may be located in a position where the user's eyes view an image.

The first lens 110 with positive refractive power includes a visual-side surface 111 and an image source-side surface 112, the visual-side surface 111 of the first lens 110 is flat in a paraxial region thereof, the image source-side surface 112 of the first lens 110 is convex in a paraxial region thereof, the image source-side surface 112 of the first lens 110 is aspheric, and the first lens 110 is made of plastic.

The second lens 120 with positive refractive power includes a visual-side surface 121 and an image source-side surface 122, the visual-side surface 121 of the second lens 120 is concave in a paraxial region thereof, the image source-side surface 122 of the second lens 120 is convex in a paraxial region thereof, the visual-side surface 121 and the image source-side surface 122 of the second lens 120 are aspheric, and the second lens 120 is made of plastic.

The optical element 130 is located on the visual-side surface 111 of the first lens 110 and includes, in order from the visual side to the image source side along the optical axis 180: an absorptive polarizer 131, a reflective polarizer 132 and a first phase retarder 133. These three elements are stacked, and the two opposite surfaces of each of these three elements are flat. Specifically, the first phase retarder 133 is located on the visual-side surface 111 of the first lens 110, the reflective polarizer 132 is located on the first phase retarder 133, and the absorptive polarizer 131 is located on the reflective polarizer 132. The first phase retarder 133 is, for example, but not limited to, a quarter-wave plate.

The partial-reflective-partial-transmissive element 140 is located on the visual-side surface 121 of the second lens 120 and has an average reflectance of at least 30%, preferably 50%, in the wavelength range of visible light. The average reflectance here is an average value of different reflectance of the partial-reflective-partial-transmissive element 140 for different wavelengths.

The second phase retarder 150 is disposed on the image source plane 160 and located between the second lens 120 and the image source plane 160. The second phase retarder 150 is, for example, but not limited to, a quarter-wave plate.

The optical lens assembly works in cooperation with an image source 170 disposed on the image source plane 160. The image source plane 160 is located between the second phase retarder 150 and the image source 170. In the present embodiment, the type of the image source 170 is, for example, but not limited to, a liquid crystal display, or may also be an OLED display, a LED display, or other displays.

The curve equation for the aspheric surface profiles of the respective lenses of the first embodiment is expressed as follows:

$$z(h) = \frac{ch^2}{1+\left[1-(k+1)c^2h^2\right]^{0.5}} + \sum(A_i)\cdot(h^i)$$

wherein:
z represents the value of a reference position at a height of h with respect to a vertex of the surface of a lens along the first optical axis 180;
c represents a paraxial curvature (i.e., a curvature of a lens surface in a paraxial region thereof) equal to 1/R (R: a paraxial radius of curvature);
h represents a vertical distance from the point on the curve of the aspheric surface to the first optical axis 180;
k represents the conic constant; and
$A_i$ represents the i-th order aspheric coefficient.

The optical lens assembly of the first embodiment utilizes the configuration and arrangement of the absorptive polarizer, the reflective polarizer, the phase retarders, the partial-reflective-partial-transmissive element and the lenses to fold the light path thereof by the transmission and reflection of light to shorten the length of the optical lens assembly required for forming an image without affecting the image quality. In a light path L in FIG. 1B, a linearly-polarized image beam from the image source 170 turns to a circularly-polarized image beam after passing through the second phase retarder 150, and the circularly-polarized image beam then passes through the second lens 120 to transmit to the partial-reflective-partial-transmissive element 140. A component of the circularly-polarized image beam transmitting to the partial-reflective-partial-transmissive element 140 serves as a circularly-polarized transmitted light component to pass through the partial-reflective-partial-transmissive element 140 and then transmit to the first lens 110. The circularly-polarized transmitted light component transmitting to the first lens 110 passes through the first lens 110 and the first phase retarder 133 sequentially to turn to a linearly-polarized transmitted light component with a polarization direction parallel to the polarization direction of the reflective polarizer 132 and transmit to the reflective polarizer 132. This linearly-polarized transmitted light component transmitting to the reflective polarizer 132 is reflected by the reflective polarizer 132 to the first phase retarder 133 to form primary reflected light of circular polarization and pass through the first lens 110, so as to transmit to the partial-reflective-partial-transmissive element 140. Then, the primary reflected light of circular polarization transmitting to the partial-reflective-partial-transmissive element 140 has a portion reflected as a secondary reflected light of circular polarization by the partial-reflective-partial-transmissive element 140, and the secondary reflected light of circular polarization passes through the first lens 110 and the first phase retarder 133 sequentially to form secondary reflected light of linear polarization. Finally, the secondary reflected light of linear polarization transmits to the user's eyes to form the image after passing through the reflective polarizer 132 and the absorptive polarizer 131.

Please refer to Tables 1-4, Table 1 shows the detailed optical data of the elements of the optical lens assembly of the first embodiment, Table 2 shows the aspheric coefficients of the aspherical surfaces of the elements of the optical lens assembly of the first embodiment, Table 3 shows the remaining parameters of the optical lens assembly of the first embodiment and the values thereof, and the values of the parameters in Tables 1 and 3 meet the conditional formulas of Table 4. A focal length of the first lens 110 is f1, a focal length of the second lens 120 is f2,a thickness of the first lens 110 along the optical axis 180 is CT1, a distance from the first lens 110 to the second lens 120 along the optical axis 180 is T12, a thickness of the second lens 120 along the optical axis 180 is CT2,a maximum effective radius of the image source-side surface 112 of the first lens 110 is CA2, a maximum effective radius of the image source-side surface 122 of the second lens 120 is CA4, an absolute value of a displacement in parallel to the optical axis 180 from an intersection between the image source-side surface 112 of the first lens 110 and the optical axis 180 to the maximum effective radius position on the image source-side surface 112 of the first lens 110 is TDP2, an absolute value of a displacement in parallel to the optical axis 180 from an intersection between the image source-side surface 122 of the second lens 120 and the optical axis 180 to the maximum effective radius position on the image source-side surface 122 of the second lens 120 is TDP4,a distance from a visual-side surface of the absorptive polarizer 131 to the image source plane 160 along an optical axis 180 is TL, a distance from the image source-side surface 122 of the second lens 120 to the image source plane 160 along the optical axis 180 is BFL, and a maximum image source height (i.e., a half of the diagonal length of the effective pixel region of the display) of the optical lens assembly is IMH.

TABLE 1

Embodiment 1
f = 33.98 mm, EPD(Entrance pupil diameter) = 10.00 mm, FOV (Field of view) = 99.98°

| Surface | | Radius of curvature | Thickness/gap | Refractive index (nd) | Abbe number (vd) | Refraction/reflection |
|---|---|---|---|---|---|---|
| 0 | Stop | Infinity | 15.000 | — | — | — |
| 1 | Absorptive polarizer | Infinity | 0.100 | 1.533 | 56.0 | Refraction |
| 2 | Reflective polarizer | Infinity | 0.100 | 1.533 | 56.0 | Refraction |
| 3 | First phase retarder | Infinity | 0.100 | 1.533 | 56.0 | Refraction |
| 4 | First lens | Infinity | 6.871 | 1.544 | 55.9 | Refraction |
| 5 | | −75.586 | 5.465 | — | — | Refraction |
| 6 | Partial-reflective-partial-transmissive element | −166.988 | −5.465 | — | — | Reflection |
| 7 | | −75.586 | −6.871 | 1.544 | 55.9 | Refraction |
| 8 | First phase retarder | Infinity | −0.100 | 1.533 | 56.0 | Refraction |
| 9 | Reflective polarizer | Infinity | −0.100 | 1.533 | 56.0 | Refraction |
| 10 | Reflective polarizer | Infinity | 0.100 | 1.533 | 56.0 | Reflection |
| 11 | First phase retarder | Infinity | 0.100 | 1.533 | 56.0 | Refraction |
| 12 | First lens | Infinity | 6.871 | 1.544 | 55.9 | Refraction |
| 13 | | −75.586 | 5.465 | — | — | Refraction |
| 14 | Second lens | −166.988 | 2.520 | 1.544 | 55.9 | Refraction |
| 15 | | −159.652 | 13.406 | — | — | — |
| 16 | Second phase retarder | Infinity | 0.100 | 1.533 | 56.0 | Refraction |
| 17 | Image source plane | Infinity | — | — | — | — |

The reference wavelength is 555 nm.

TABLE 2

Embodiment 1
Aspheric Coefficients

| Surface | 4, 8, 12 | 5, 7, 13 | 6, 14 | 15 |
|---|---|---|---|---|
| K: | 0.0000E+00 | −1.7232E−01 | −2.1449E+01 | 0.0000E+00 |
| A2: | 0.0000E+00 | 0.0000E+00 | 0.0000E+00 | 0.0000E+00 |
| A4: | 0.0000E+00 | 6.4035E−06 | −3.8260E−06 | −1.0371E−05 |
| A6: | 0.0000E+00 | −3.2927E−08 | 1.6719E−08 | 7.0970E−08 |
| A8: | 0.0000E+00 | 9.0472E−11 | −4.5807E−11 | −1.9805E−10 |
| A10: | 0.0000E+00 | −1.4396E−13 | 7.5410E−14 | 3.0337E−13 |
| A12: | 0.0000E+00 | 1.3636E−16 | −7.3287E−17 | −2.6845E−16 |
| A14: | 0.0000E+00 | −7.1892E−20 | 3.8215E−20 | 1.2554E−19 |
| A16: | 0.0000E+00 | 1.6696E−23 | −8.2559E−24 | −2.4044E−23 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

TABLE 3

Embodiment 1

| f1 [mm] | 138.11 | CT2 [mm] | 2.52 | TDP4 [mm] | 3.35 |
|---|---|---|---|---|---|
| f2 [mm] | 5921.13 | CA2 [mm] | 31.26 | TL [mm] | 28.66 |
| CT1 [mm] | 6.87 | CA4 [mm] | 31.35 | BFL [mm] | 13.51 |
| T12 [mm] | 5.46 | TDP2 [mm] | 5.66 | IMH [mm] | 27.24 |

TABLE 4

Embodiment 1

| f*IMH/TL [mm] | 32.29 | R2/R4 | 0.47 | CA2/CT1 | 4.55 |
|---|---|---|---|---|---|
| CA2/TDP2 | 5.53 | R3/f2 | −0.03 | CA4/CT2 | 12.44 |
| IMH/f | 0.80 | R2/CT1 | −11.00 | f/f2 | 0.01 |
| f/f1 | 0.25 | BFL/CT2 | 5.36 | R2/R3 | 0.45 |
| f1/f2 | 0.02 | T12/BFL | 0.40 | R2/f1 | −0.55 |
| R3/R4 | 1.05 | CA4/TDP4 | 9.37 | R4/f2 | −0.03 |
| CT1/CT2 | 2.73 | — | | — | |

In Table 1, the units of the radius of curvature, the thickness, the gap and the focal length are expressed in mm, and the surface numbers 17-0 respectively represent the surfaces to which the light sequentially transmits from the image source plane 160 to the stop 100 along the light path L, wherein the surface 0 represents a gap between the stop 100 (or the user's eyes) and the absorptive polarizer 131 along the optical axis 180; the surface 1 represents the thickness of the absorptive polarizer 131 along the first optical axis 180; the surfaces 2, 9 and 10 represent the thickness of the reflective polarizer 132 along the optical axis 180; the surfaces 3, 8 and 11 represent the thickness of the first phase retarder 133 along the optical axis 180; the surfaces 4, 7 and 12 represent the thickness of the first lens 110 along the optical axis 180; the surfaces 5, 6 and 13 represent a gap between the first lens 110 and the second lens 120 along the optical axis 180; the surface 14 represents the thickness of the second lens 120 along the optical axis 180; the surface 15 represents a gap between the second lens 120 and the second phase retarder 150 along the optical axis 180; the surface 16 represents the thickness of the second phase retarder 150 along the optical axis 180; and the surface 17 represents a gap between the second phase retarder 150 and the image source plane 160 along the optical axis 180. The gaps and thicknesses having a positive sign in Table 1 denote the transmission direction of light is toward the stop 100, and the gaps and thicknesses having a negative sign in Table 1 denote the transmission direction of light is toward the image source plane 160.

In table 2, k represents the conic constant of the equation of aspheric surface profiles, and A2, A4, A6, A8, A10, A12, A14, A16, A18, and A20 represent the high-order aspheric coefficients.

The respective tables presented below for respective one of other embodiments are based on the schematic view of this embodiment, and the definitions of parameters in the tables are the same as those in Tables 1-4 of the first embodiment. Therefore, an explanation in this regard will not be provided again.

Second Embodiment

Figure 2:
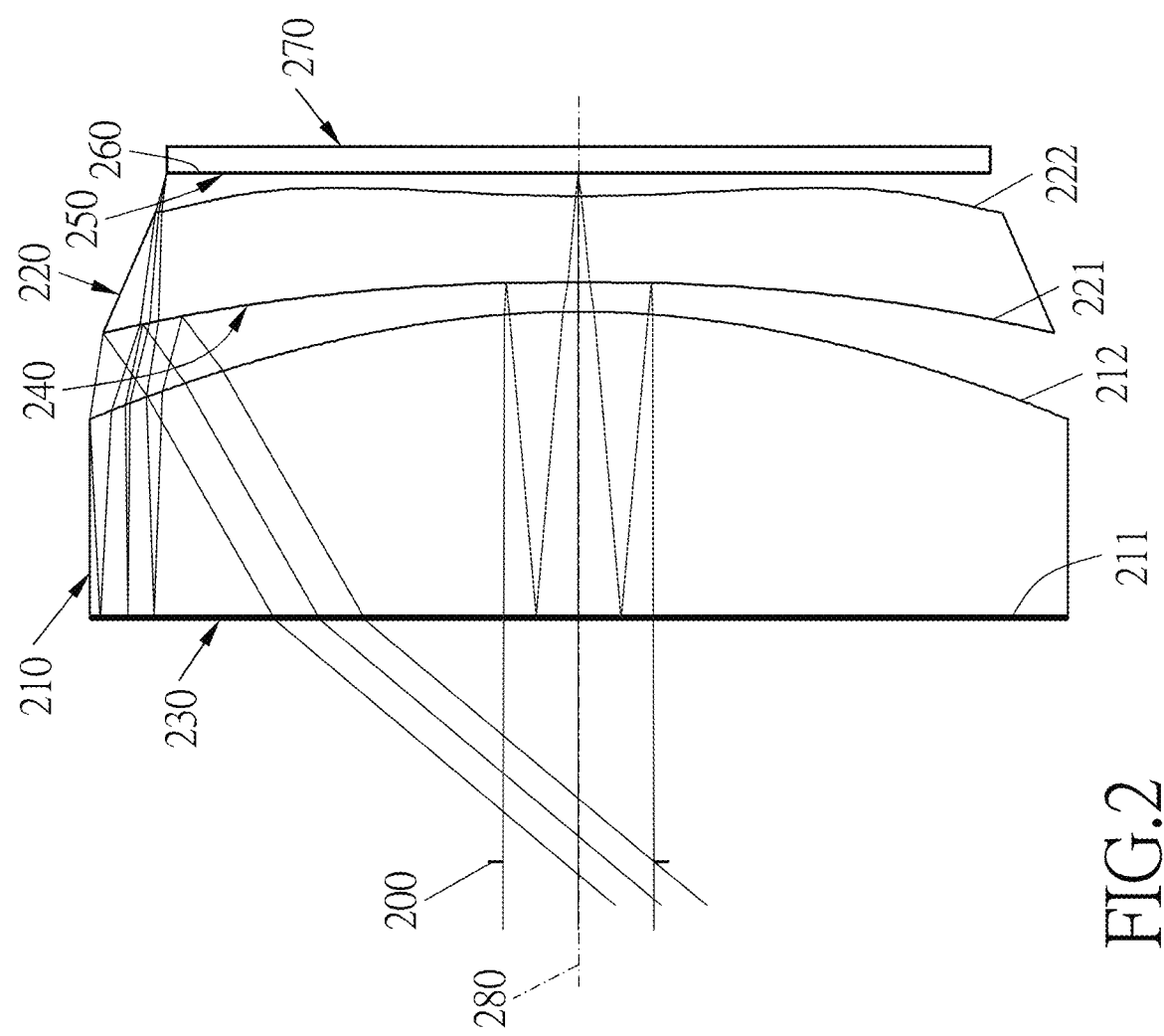
FIG. 2 is a schematic view of an optical lens assembly in accordance with a second embodiment of the present invention.

Referring to FIG. 2, an optical lens assembly in accordance with a second embodiment of the present invention includes, in order from a visual side to an image source side along an optical axis 280: a stop 200, an optical element 230, a first lens 210, a partial-reflective-partial-transmissive element 240, a second lens 220, a second phase retarder 250 and an image source plane 260. The optical lens assembly has a total of two lenses with refractive power, but not is limited thereto.

The stop 200 may be located in a position where the user's eyes view an image.

The first lens 210 with positive refractive power includes a visual-side surface 211 and an image source-side surface 212, the visual-side surface 111 of the first lens 110 is flat in a paraxial region thereof, the image source-side surface 212 of the first lens 210 is convex in a paraxial region thereof, the image source-side surface 212 of the first lens 210 is aspheric, and the first lens 210 is made of plastic.

The second lens 220 with negative refractive power includes a visual-side surface 221 and an image source-side surface 222, the visual-side surface 221 of the second lens 220 is concave in a paraxial region thereof, the image source-side surface 222 of the second lens 220 is concave in a paraxial region thereof, the visual-side surface 221 and the image source-side surface 222 of the second lens 220 are aspheric, and the second lens 220 is made of plastic.

The optical element 230 is located on the visual-side surface 211 of the first lens 210, and the configuration of the optical element 230 is the same as that of the optical element 130 of the first embodiment and will not be explained again.

The partial-reflective-partial-transmissive element 240 is located on the visual-side surface 221 of the second lens 220, and the configuration of the partial-reflective-partial-transmissive element 240 is the same as that of the partial-reflective-partial-transmissive element 140 of the first embodiment and will not be explained again.

The second phase retarder 250 is disposed on the image source plane 260, and the configuration of the second phase retarder 250 is the same as that of the second phase retarder 150 of the first embodiment and will not be explained again. The optical lens assembly works in cooperation with an image source 270 disposed on the image source plane 260. The image source plane 260 is located between the second phase retarder 250 and the image source 270. In the present embodiment, the type of the image source 270 is, for example, but not limited to, a liquid crystal display, or may be an OLED display, a LED display, or other displays.

Please refer to Tables 5-8, Table 5 shows the detailed optical data of the elements of the optical lens assembly of the second embodiment, Table 6 shows the aspheric coefficients of the aspherical surfaces of the elements of the optical lens assembly of the second embodiment, Table 7 shows the remaining parameters of the optical lens assembly of the second embodiment and the values thereof, and the values of the parameters in Tables 5 and 7 meet the conditional formulas of Table 8. In the second embodiment, the equation of the aspheric surface profiles of the aforementioned lenses is the same as the equation of the aspheric surface profiles of the aforementioned lenses in the first embodiment. The definitions of the surfaces in Table 5 can be referred to the relevant description of Table 1 and will not be explained again.

TABLE 5

Embodiment 2
f = 35.21 mm, EPD(Entrance pupil diameter) = 10.00 mm, FOV (Field of view) = 100.00°

| Surface | | Radius of curvature | Thickness/gap | Refractive index (nd) | Abbe number (vd) | Refraction/reflection |
|---|---|---|---|---|---|---|
| 0 | Stop | Infinity | 15.000 | — | — | — |
| 1 | Absorptive polarizer | Infinity | 0.100 | 1.533 | 56.0 | Refraction |
| 2 | Reflective polarizer | Infinity | 0.100 | 1.533 | 56.0 | Refraction |
| 3 | First phase retarder | Infinity | 0.100 | 1.533 | 56.0 | Refraction |
| 4 | First lens | Infinity | 20.122 | 1.544 | 55.9 | Refraction |
| 5 | | −61.025 | 1.961 | — | — | Refraction |
| 6 | Partial-reflective-partial-transmissive element | −201.149 | −1.961 | — | — | Reflection |
| 7 | | −61.025 | −20.122 | 1.544 | 55.9 | Refraction |
| 8 | First phase retarder | Infinity | −0.100 | 1.533 | 56.0 | Refraction |
| 9 | Reflective polarizer | Infinity | −0.100 | 1.533 | 56.0 | Refraction |
| 10 | Reflective polarizer | Infinity | 0.100 | 1.533 | 56.0 | Reflection |
| 11 | First phase retarder | Infinity | 0.100 | 1.533 | 56.0 | Refraction |
| 12 | First lens | Infinity | 20.122 | 1.544 | 55.9 | Refraction |
| 13 | | −61.025 | 1.961 | — | — | Refraction |
| 14 | Second lens | −201.149 | 5.672 | 1.544 | 55.9 | Refraction |
| 15 | | 90.137 | 1.412 | — | — | — |
| 16 | Second phase retarder | Infinity | 0.100 | 1.533 | 56.0 | Refraction |
| 17 | Image source plane | Infinity | — | — | — | — |

The reference wavelength is 555 nm.

TABLE 6

Embodiment 2
Aspheric Coefficients

| Surface | 4, 8, 12 | 5, 7, 13 | 6, 14 | 15 |
|---|---|---|---|---|
| K: | 0.0000E+00 | −1.7586E+00 | 9.9042E+00 | 3.0046E+00 |
| A2: | 0.0000E+00 | 0.0000E+00 | 0.0000E+00 | 0.0000E+00 |
| A4: | 0.0000E+00 | 7.1949E−06 | −4.2447E−06 | −2.4003E−05 |
| A6: | 0.0000E+00 | −3.2457E−08 | 1.7398E−08 | 7.5717E−08 |
| A8: | 0.0000E+00 | 8.8592E−11 | −4.6642E−11 | −2.0201E−10 |
| A10: | 0.0000E+00 | −1.4391E−13 | 7.5732E−14 | 3.0150E−13 |
| A12: | 0.0000E+00 | 1.3737E−16 | −7.2738E−17 | −2.5391E−16 |
| A14: | 0.0000E+00 | −7.1299E−20 | 3.8211E−20 | 1.1871E−19 |
| A16: | 0.0000E+00 | 1.5489E−23 | −8.4506E−24 | −2.3304E−23 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

TABLE 7

Embodiment 2

| | | | | | |
|---|---|---|---|---|---|
| f1 [mm] | 111.51 | CT2 [mm] | 5.67 | TDP4 [mm] | 1.09 |
| f2 [mm] | −112.96 | CA2 [mm] | 32.37 | TL [mm] | 29.57 |
| CT1 [mm] | 20.12 | CA4 [mm] | 28.03 | BFL [mm] | 1.51 |
| T12 [mm] | 1.96 | TDP2 [mm] | 7.14 | IMH [mm] | 27.24 |

TABLE 8

Embodiment 2

| | | | | | |
|---|---|---|---|---|---|
| f*IMH/TL [mm] | 32.44 | R2/R4 | −0.68 | CA2/CT1 | 1.61 |
| CA2/TDP2 | 4.53 | R3/f2 | 1.78 | CA4/CT2 | 4.94 |
| IMH/f | 0.77 | R2/CT1 | −3.03 | f/f2 | −0.31 |
| f/f1 | 0.32 | BFL/CT2 | 0.27 | R2/R3 | 0.30 |
| f1/f2 | −0.99 | T12/BFL | 1.30 | R2/f1 | −0.55 |
| R3/R4 | −2.23 | CA4/TDP4 | 25.76 | R4/f2 | −0.80 |
| CT1/CT2 | 3.55 | — | | — | — |

Third Embodiment

Figure 3:
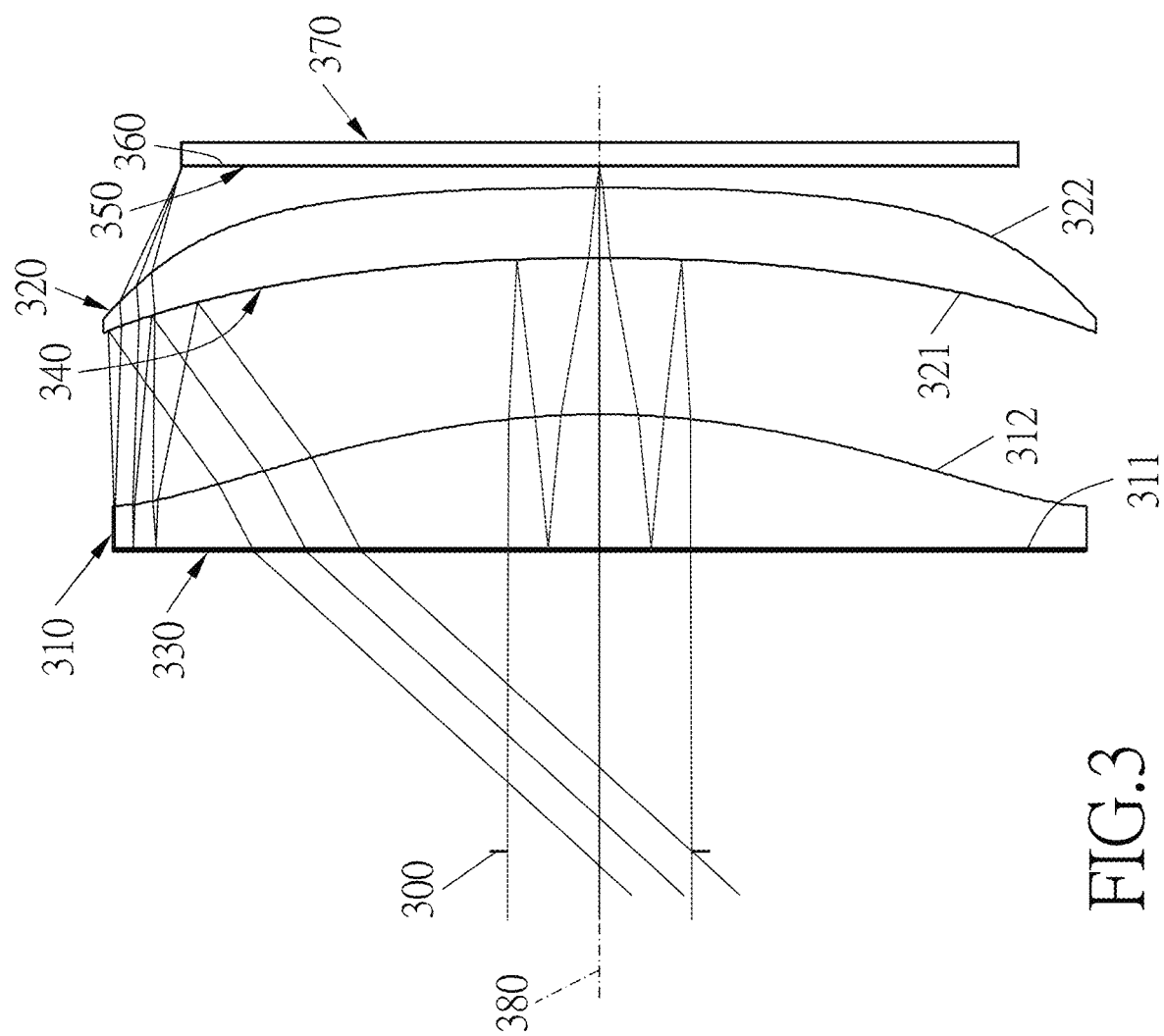
FIG. 3 is a schematic view of an optical lens assembly in accordance with a third embodiment of the present invention.

Referring to FIG. 3, an optical lens assembly in accordance with a third embodiment of the present invention includes, in order from a visual side to an image source side along an optical axis 380: a stop 300, an optical element 330, a first lens 310, a partial-reflective-partial-transmissive element 340, a second lens 320, a second phase retarder 350 and an image source plane 360. The optical lens assembly has a total of two lenses with refractive power, but not is limited thereto.

The stop 300 may be located in a position where the user's eyes view an image.

The first lens 310 with positive refractive power includes a visual-side surface 311 and an image source-side surface 312, the visual-side surface 311 of the first lens 310 is flat in a paraxial region thereof, the image source-side surface 312 of the first lens 310 is convex in a paraxial region thereof, the image source-side surface 312 of the first lens 310 is aspheric, and the first lens 310 is made of plastic.

The second lens 320 with negative refractive power includes a visual-side surface 321 and an image source-side surface 322, the visual-side surface 321 of the second lens 320 is concave in a paraxial region thereof, the image source-side surface 322 of the second lens 320 is convex in a paraxial region thereof, the visual-side surface 321 and the image source-side surface 322 of the second lens 320 are aspheric, and the second lens 320 is made of plastic.

The optical element 330 is located on the visual-side surface 311 of the first lens 310, and the configuration of the optical element 330 is the same as that of the optical element 130 of the first embodiment and will not be explained again.

The partial-reflective-partial-transmissive element 340 is located on the visual-side surface 321 of the second lens 320, and the configuration of the partial-reflective-partial-transmissive element 340 is the same as that of the partial-reflective-partial-transmissive element 140 of the first embodiment and will not be explained again.

The second phase retarder 350 is disposed on the image source plane 360, and the configuration of the second phase retarder 350 is the same as that of the second phase retarder 150 of the first embodiment and will not be explained again.

The optical lens assembly works in cooperation with an image source 370 disposed on the image source plane 360. The image source plane 360 is located between the second phase retarder 350 and the image source 370. In the present embodiment, the type of the image source 370 is, for example, but not limited to, a liquid crystal display, or may be an OLED display, a LED display, or other displays.

Please refer to Tables 9-12, Table 9 shows the detailed optical data of the elements of the optical lens assembly of the third embodiment, Table 10 shows the aspheric coefficients of the aspherical surfaces of the elements of the optical lens assembly of the third embodiment, Table 11 shows the remaining parameters of the optical lens assembly of the third embodiment and the values thereof, and the values of the parameters in Tables 9 and 11 meet the conditional formulas of Table 12. In the third embodiment, the equation of the aspheric surface profiles of the aforementioned lenses is the same as the equation of the aspheric surface profiles of the aforementioned lenses in the first embodiment. The definitions of the surfaces in Table 9 can be referred to the relevant description of Table 1 and will not be explained again.

TABLE 9

Embodiment 3
f = 27.15 mm, EPD(Entrance pupil diameter) = 10.00 mm, FOV (Field of view) = 100.00°

| Surface | | Radius of curvature | Thickness/ gap | Refractive index (nd) | Abbe number (vd) | Refraction/ reflection |
|---|---|---|---|---|---|---|
| 0 | Stop | Infinity | 15.000 | — | — | — |
| 1 | Absorptive polarizer | Infinity | 0.100 | 1.533 | 56.0 | Refraction |
| 2 | Reflective polarizer | Infinity | 0.100 | 1.533 | 56.0 | Refraction |
| 3 | First phase retarder | Infinity | 0.100 | 1.533 | 56.0 | Refraction |
| 4 | First lens | Infinity | 6.572 | 1.544 | 55.9 | Refraction |
| 5 | | −49.053 | 7.826 | — | — | Refraction |
| 6 | Partial-reflective- partial- transmissive element | −137.971 | −7.826 | — | — | Reflection |
| 7 | | −49.053 | −6.572 | 1.544 | 55.9 | Refraction |
| 8 | First phase retarder | Infinity | −0.100 | 1.533 | 56.0 | Refraction |
| 9 | Reflective polarizer | Infinity | −0.100 | 1.533 | 56.0 | Refraction |
| 10 | Reflective polarizer | Infinity | 0.100 | 1.533 | 56.0 | Reflection |
| 11 | First phase retarder | Infinity | 0.100 | 1.533 | 56.0 | Refraction |
| 12 | First lens | Infinity | 6.572 | 1.544 | 55.9 | Refraction |
| 13 | | −49.053 | 7.826 | — | — | Refraction |
| 14 | Second lens | −137.971 | 3.497 | 1.544 | 55.9 | Refraction |
| 15 | | −427.379 | 1.000 | — | — | — |

TABLE 9-continued

Embodiment 3
f = 27.15 mm, EPD(Entrance pupil diameter) = 10.00 mm, FOV (Field of view) = 100.00°

| Surface | | Radius of curvature | Thickness/ gap | Refractive index (nd) | Abbe number (vd) | Refraction/ reflection |
|---|---|---|---|---|---|---|
| 16 | Second phase retarder | Infinity | 0.100 | 1.533 | 56.0 | Refraction |
| 17 | Image source plane | Infinity | — | — | — | — |

The reference wavelength is 555 nm.

TABLE 10

Embodiment 3
Aspheric Coefficients

| Surface | 4, 8, 12 | 5, 7, 13 | 6, 14 | 15 |
|---|---|---|---|---|
| K: | 0.0000E+00 | −2.6019E+00 | −2.5293E+00 | 9.5000E+01 |
| A2: | 0.0000E+00 | 0.0000E+00 | 0.0000E+00 | 0.0000E+00 |
| A4: | 0.0000E+00 | 1.2550E−05 | −7.1239E−06 | −2.6315E−05 |
| A6: | 0.0000E+00 | −8.1417E−08 | 4.1014E−08 | 1.7370E−07 |
| A8: | 0.0000E+00 | 3.2485E−10 | −1.6462E−10 | −7.1063E−10 |
| A10: | 0.0000E+00 | −7.4475E−13 | 3.9007E−13 | 1.5675E−12 |
| A12: | 0.0000E+00 | 1.0129E−15 | −5.4298E−16 | −1.9913E−15 |
| A14: | 0.0000E+00 | −7.6662E−19 | 4.0785E−19 | 1.3464E−18 |
| A16: | 0.0000E+00 | 2.5675E−22 | −1.2792E−22 | −3.6835E−22 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

TABLE 11

Embodiment 3

| f1 [mm] | 89.63 | CT2 [mm] | 3.50 | TDP4 [mm] | 5.72 |
|---|---|---|---|---|---|
| f2 [mm] | −373.89 | CA2 [mm] | 26.45 | TL [mm] | 19.30 |
| CT1 [mm] | 6.57 | CA4 [mm] | 26.13 | BFL [mm] | 1.10 |
| T12 [mm] | 7.83 | TDP2 [mm] | 4.57 | IMH [mm] | 22.70 |

TABLE 12

Embodiment 3

| f*IMH/TL [mm] | 31.95 | R2/R4 | 0.11 | CA2/CT1 | 4.02 |
|---|---|---|---|---|---|
| CA2/TDP2 | 5.78 | R3/f2 | 0.37 | CA4/CT2 | 7.47 |
| IMH/f | 0.84 | R2/CT1 | −7.46 | f/f2 | −0.07 |
| f/f1 | 0.30 | BFL/CT2 | 0.31 | R2/R3 | 0.36 |
| f1/f2 | −0.24 | T12/BFL | 7.11 | R2/f1 | −0.55 |
| R3/R4 | 0.32 | CA4/TDP4 | 4.57 | R4/f2 | 1.14 |
| CT1/CT2 | 1.88 | — | | — | — |

Fourth Embodiment

Figure 4:
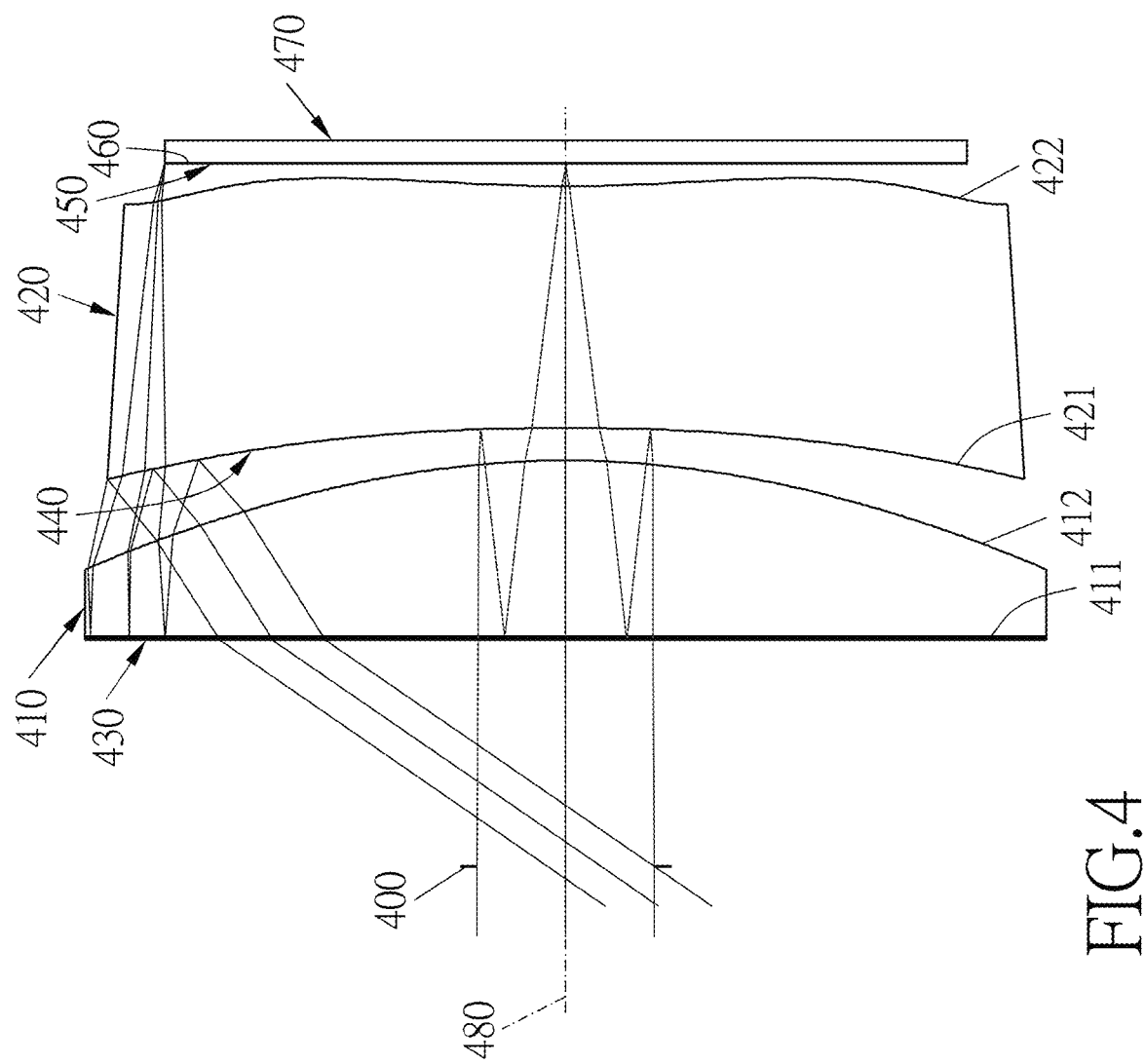
FIG. 4 is a schematic view of an optical lens assembly in accordance with a fourth embodiment of the present invention.

Referring to FIG. 4, an optical lens assembly in accordance with a fourth embodiment of the present invention includes, in order from a visual side to an image source side along an optical axis 480: a stop 400, an optical element 430, a first lens 410, a partial-reflective-partial-transmissive element 440, a second lens 420, a second phase retarder 450 and an image source plane 460. The optical lens assembly has a total of two lenses with refractive power, but not is limited thereto.

The stop 400 may be located in a position where the user's eyes view an image.

The first lens 410 with positive refractive power includes a visual-side surface 411 and an image source-side surface 412, the visual-side surface 411 of the first lens 410 is flat in a paraxial region thereof, the image source-side surface 412 of the first lens 410 is convex in a paraxial region thereof, the image source-side surface 412 of the first lens 410 is aspheric, and the first lens 410 is made of plastic.

The second lens 420 with negative refractive power includes a visual-side surface 421 and an image source-side surface 422, the visual-side surface 421 of the second lens 420 is concave in a paraxial region thereof, the image source-side surface 422 of the second lens 420 is concave in a paraxial region thereof, the visual-side surface 421 and the image source-side surface 422 of the second lens 420 are aspheric, and the second lens 420 is made of plastic.

The optical element 430 is located on the visual-side surface 411 of the first lens 410, and the configuration of the optical element 430 is the same as that of the optical element 130 of the first embodiment and will not be explained again.

The partial-reflective-partial-transmissive element 440 is located on the visual-side surface 421 of the second lens 420, and the configuration of the partial-reflective-partial-transmissive element 440 is the same as that of the partial-reflective-partial-transmissive element 140 of the first embodiment and will not be explained again.

The second phase retarder 450 is disposed on the image source plane 460, and the configuration of the second phase retarder 450 is the same as that of the second phase retarder 150 of the first embodiment and will not be explained again.

The optical lens assembly works in cooperation with an image source 470 disposed on the image source plane 460. The image source plane 460 is located between the second phase retarder 450 and the image source 470. In the present embodiment, the type of the image source 470 is, for example, but not limited to, a liquid crystal display, or may be an OLED display, a LED display, or other displays.

Please refer to Tables 13-16, Table 13 shows the detailed optical data of the elements of the optical lens assembly of the fourth embodiment, Table 14 shows the aspheric coefficients of the aspherical surfaces of the elements of the optical lens assembly of the fourth embodiment, Table 15 shows the remaining parameters of the optical lens assembly of the fourth embodiment and the values thereof, and the values of the parameters in Tables 13 and 15 meet the conditional formulas of Table 16. In the fourth embodiment, the equation of the aspheric surface profiles of the aforementioned lenses is the same as the equation of the aspheric surface profiles of the aforementioned lenses in the first embodiment. The definitions of the surfaces in Table 13 can be referred to the relevant description of Table 1 and will not be explained again.

TABLE 13

Embodiment 4
f = 26.71 mm, EPD(Entrance pupil diameter) = 10.00 mm, FOV (Field of view) = 110.00°

| Surface | | Radius of curvature | Thickness/ gap | Refractive index (nd) | Abbe number (vd) | Refraction/ reflection |
|---|---|---|---|---|---|---|
| 0 | Stop | Infinity | 15.000 | — | — | — |
| 1 | Absorptive polarizer | Infinity | 0.100 | 1.533 | 56.0 | Refraction |
| 2 | Reflective polarizer | Infinity | 0.100 | 1.533 | 56.0 | Refraction |
| 3 | First phase retarder | Infinity | 0.100 | 1.533 | 56.0 | Refraction |
| 4 | First lens | Infinity | 10.000 | 1.544 | 55.9 | Refraction |
| 5 | | −49.489 | 1.873 | — | — | Refraction |
| 6 | Partial-reflective-partial-transmissive element | −154.792 | −1.873 | — | — | Reflection |
| 7 | | −49.489 | −10.000 | 1.544 | 55.9 | Refraction |
| 8 | First phase retarder | Infinity | −0.100 | 1.533 | 56.0 | Refraction |
| 9 | Reflective polarizer | Infinity | −0.100 | 1.533 | 56.0 | Refraction |
| 10 | Reflective polarizer | Infinity | 0.100 | 1.533 | 56.0 | Reflection |
| 11 | First phase retarder | Infinity | 0.100 | 1.533 | 56.0 | Refraction |
| 12 | First lens | Infinity | 10.000 | 1.544 | 55.9 | Refraction |
| 13 | | −49.489 | 1.873 | — | — | Refraction |
| 14 | Second lens | −154.792 | 13.864 | 1.544 | 55.9 | Refraction |
| 15 | | 75.114 | 1.177 | — | — | — |
| 16 | Second phase retarder | Infinity | 0.100 | 1.533 | 56.0 | Refraction |
| 17 | Image source plane | Infinity | — | — | — | — |

The reference wavelength is 555 nm.

TABLE 14

Embodiment 4
Aspheric Coefficients

| Surface | 4, 8, 12 | 5, 7, 13 | 6, 14 | 15 |
|---|---|---|---|---|
| K: | 0.0000E+00 | −1.5305E+00 | 9.5299E+00 | 3.0046E+00 |
| A2: | 0.0000E+00 | 0.0000E+00 | 0.0000E+00 | 0.0000E+00 |
| A4: | 0.0000E+00 | 1.2440E−05 | −7.6088E−06 | −4.1477E−05 |
| A6: | 0.0000E+00 | −7.9781E−08 | 4.4038E−08 | 1.8841E−07 |
| A8: | 0.0000E+00 | 3.1588E−10 | −1.6787E−10 | −7.2384E−10 |
| A10: | 0.0000E+00 | −7.4280E−13 | 3.9064E−13 | 1.5557E−12 |
| A12: | 0.0000E+00 | 1.0217E−15 | −5.3942E−16 | −1.8866E−15 |
| A14: | 0.0000E+00 | −7.6197E−19 | 4.0986E−19 | 1.2701E−18 |
| A16: | 0.0000E+00 | 2.3773E−22 | −1.3198E−22 | −3.5905E−22 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

TABLE 15

Embodiment 4

| f1 [mm] | 90.43 | CT2 [mm] | 13.86 | TDP4 [mm] | 0.90 |
|---|---|---|---|---|---|
| f2 [mm] | −90.48 | CA2 [mm] | 27.03 | TL [mm] | 27.31 |
| CT1 [mm] | 10.00 | CA4 [mm] | 23.33 | BFL [mm] | 1.28 |
| T12 [mm] | 1.87 | TDP2 [mm] | 6.19 | IMH [mm] | 22.70 |

TABLE 16

Embodiment 4

| f*IMH/TL [mm] | 22.20 | R2/R4 | −0.66 | CA2/CT1 | 2.70 |
|---|---|---|---|---|---|
| CA2/TDP2 | 4.37 | R3/f2 | 1.71 | CA4/CT2 | 1.68 |
| IMH/f | 0.85 | R2/CT1 | −4.95 | f/f2 | −0.30 |
| f/f1 | 0.30 | BFL/CT2 | 0.09 | R2/R3 | 0.32 |
| f1/f2 | −1.00 | T12/BFL | 1.47 | R2/f1 | −0.55 |
| R3/R4 | −2.06 | CA4/TDP4 | 25.86 | R4/f2 | −0.83 |
| CT1/CT2 | 0.72 | — | | — | — |

Fifth Embodiment

Figure 5:
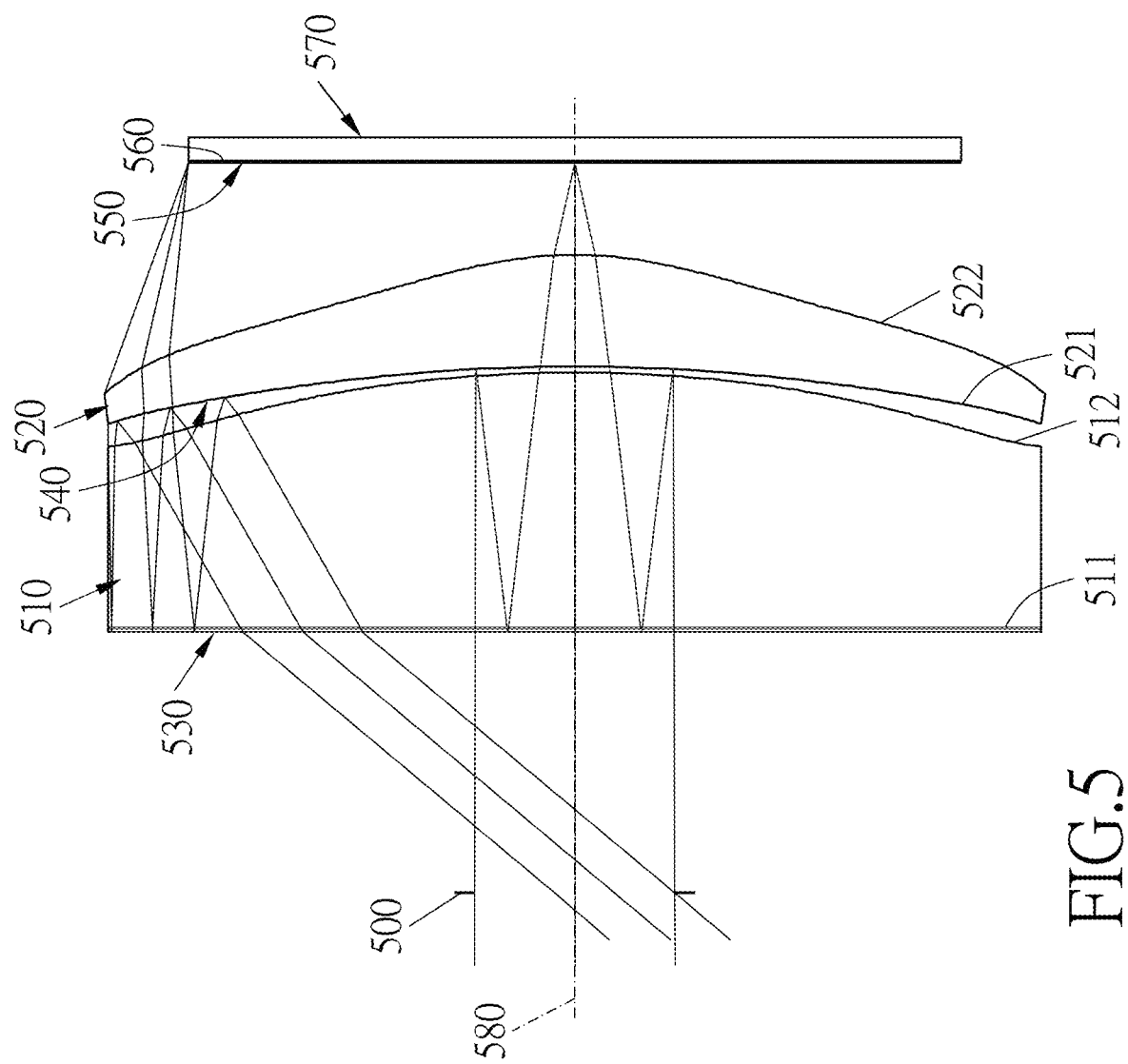
FIG. 5 is a schematic view of an optical lens assembly in accordance with a fifth embodiment of the present invention.

Referring to FIG. 5, an optical lens assembly in accordance with a fifth embodiment of the present invention includes, in order from a visual side to an image source side along an optical axis 580: a stop 500, an optical element 530, a first lens 510, a partial-reflective-partial-transmissive element 540, a second lens 520, a second phase retarder 550 and an image source plane 560. The optical lens assembly has a total of two lenses with refractive power, but not is limited thereto.

The stop 500 may be located in a position where the user's eyes view an image.

The first lens 510 with positive refractive power includes a visual-side surface 511 and an image source-side surface 512, the visual-side surface 511 of the first lens 510 is flat in a paraxial region thereof, the image source-side surface 512 of the first lens 510 is convex in a paraxial region thereof, the image source-side surface 512 of the first lens 510 is aspheric, and the first lens 510 is made of plastic.

The second lens 520 with positive refractive power includes a visual-side surface 521 and an image source-side surface 522, the visual-side surface 521 of the second lens 520 is concave in a paraxial region thereof, the image source-side surface 522 of the second lens 520 is convex in a paraxial region thereof, the visual-side surface 521 and the image source-side surface 522 of the second lens 520 are aspheric, and the second lens 520 is made of plastic.

The optical element 530 is located on the visual-side surface 511 of the first lens 510, and the configuration of the optical element 530 is the same as that of the optical element 130 of the first embodiment and will not be explained again.

The partial-reflective-partial-transmissive element 540 is located on the visual-side surface 521 of the second lens 520, and the configuration of the partial-reflective-partial-transmissive element 540 is the same as that of the partial-reflective-partial-transmissive element 140 of the first embodiment and will not be explained again.

The second phase retarder 550 is disposed on the image source plane 560, and the configuration of the second phase retarder 550 is the same as that of the second phase retarder 150 of the first embodiment and will not be explained again.

The optical lens assembly works in cooperation with an image source 570 disposed on the image source plane 560. The image source plane 560 is located between the second phase retarder 550 and the image source 570. In the present embodiment, the type of the image source 570 is, for example, but not limited to, a liquid crystal display, or may be an OLED display, a LED display, or other displays.

Please refer to Tables 17-20, Table 17 shows the detailed optical data of the elements of the optical lens assembly of the fifth embodiment, Table 18 shows the aspheric coefficients of the aspherical surfaces of the elements of the optical lens assembly of the fifth embodiment, Table 19 shows the remaining parameters of the optical lens assembly of the fifth embodiment and the values thereof, and the values of the parameters in Tables 17 and 19 meet the conditional formulas of Table 20. In the fifth embodiment, the equation of the aspheric surface profiles of the aforementioned lenses is the same as the equation of the aspheric surface profiles of the aforementioned lenses in the first embodiment. The definitions of the surfaces in Table 17 can be referred to the relevant description of Table 1 and will not be explained again.

TABLE 19

Embodiment 5

| | | | | | |
|---|---|---|---|---|---|
| f1 [mm] | 121.37 | CT2 [mm] | 5.58 | TDP4 [mm] | 6.96 |
| f2 [mm] | 40.90 | CA2 [mm] | 23.25 | TL [mm] | 23.51 |
| CT1 [mm] | 12.72 | CA4 [mm] | 23.46 | BFL [mm] | 4.61 |
| T12 [mm] | 0.30 | TDP2 [mm] | 3.68 | IMH [mm] | 19.25 |

TABLE 20

Embodiment 5

| | | | | | |
|---|---|---|---|---|---|
| f*IMH/TL [mm] | 18.36 | R2/R4 | 3.58 | CA2/CT1 | 1.83 |
| CA2/TDP2 | 6.32 | R3/f2 | −2.36 | CA4/CT2 | 4.20 |
| IMH/f | 0.86 | R2/CT1 | −5.22 | f/f2 | 0.55 |
| f/f1 | 0.18 | BFL/CT2 | 0.83 | R2/R3 | 0.69 |
| f1/f2 | 2.97 | T12/BFL | 0.07 | R2/f1 | −0.55 |
| R3/R4 | 5.21 | CA4/TDP4 | 3.37 | R4/f2 | −0.45 |
| CT1/CT2 | 2.28 | — | | — | — |

TABLE 17

Embodiment 5
f = 22.43 mm, EPD(Entrance pupil diameter) = 10.00 mm, FOV (Field of view) = 100.00°

| Surface | | Radius of curvature | Thickness/ gap | Refractive index (nd) | Abbe number (vd) | Refraction/ reflection |
|---|---|---|---|---|---|---|
| 0 | Stop | Infinity | 15.000 | — | — | — |
| 1 | Absorptive polarizer | Infinity | 0.100 | 1.533 | 56.0 | Refraction |
| 2 | Reflective polarizer | Infinity | 0.100 | 1.533 | 56.0 | Refraction |
| 3 | First phase retarder | Infinity | 0.100 | 1.533 | 56.0 | Refraction |
| 4 | First lens | Infinity | 12.719 | 1.544 | 55.9 | Refraction |
| 5 | | −66.422 | 0.300 | — | — | Refraction |
| 6 | Partial-reflective-partial-transmissive element | −96.521 | −0.300 | — | — | Reflection |
| 7 | | −66.422 | −12.719 | 1.544 | 55.9 | Refraction |
| 8 | First phase retarder | Infinity | −0.100 | 1.533 | 56.0 | Refraction |
| 9 | Reflective polarizer | Infinity | −0.100 | 1.533 | 56.0 | Refraction |
| 10 | Reflective polarizer | Infinity | 0.100 | 1.533 | 56.0 | Reflection |
| 11 | First phase retarder | Infinity | 0.100 | 1.533 | 56.0 | Refraction |
| 12 | First lens | Infinity | 12.719 | 1.544 | 55.9 | Refraction |
| 13 | | −66.422 | 0.300 | — | — | Refraction |
| 14 | Second lens | −96.521 | 5.583 | 1.544 | 55.9 | Refraction |
| 15 | | −18.543 | 4.509 | — | — | — |
| 16 | Second phase retarder | Infinity | 0.100 | 1.533 | 56.0 | Refraction |
| 17 | Image source plane | Infinity | — | — | — | — |

The reference wavelength is 555 nm.

TABLE 18

Embodiment 5
Aspheric Coefficients

| Surface | 4, 8, 12 | 5, 7, 13 | 6, 14 | 15 |
|---|---|---|---|---|
| K: | 0.0000E+00 | 1.4403E+00 | −1.1792E+01 | −9.1646E+00 |
| A2: | 0.0000E+00 | 0.0000E+00 | 0.0000E+00 | 0.0000E+00 |
| A4: | 0.0000E+00 | 1.5488E−05 | −8.3557E−06 | −2.5845E−05 |
| A6: | 0.0000E+00 | −1.8030E−07 | 9.4009E−08 | 3.9353E−07 |
| A8: | 0.0000E+00 | 1.0152E−09 | −5.3383E−10 | −2.2525E−09 |
| A10: | 0.0000E+00 | −3.2710E−12 | 1.7329E−12 | 6.9236E−12 |
| A12: | 0.0000E+00 | 6.2369E−15 | −3.3111E−15 | −1.2193E−14 |
| A14: | 0.0000E+00 | −6.5443E−18 | 3.4634E−18 | 1.1481E−17 |
| A16: | 0.0000E+00 | 2.9693E−21 | −1.5521E−21 | −4.5347E−21 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

Sixth Embodiment

Figure 6:
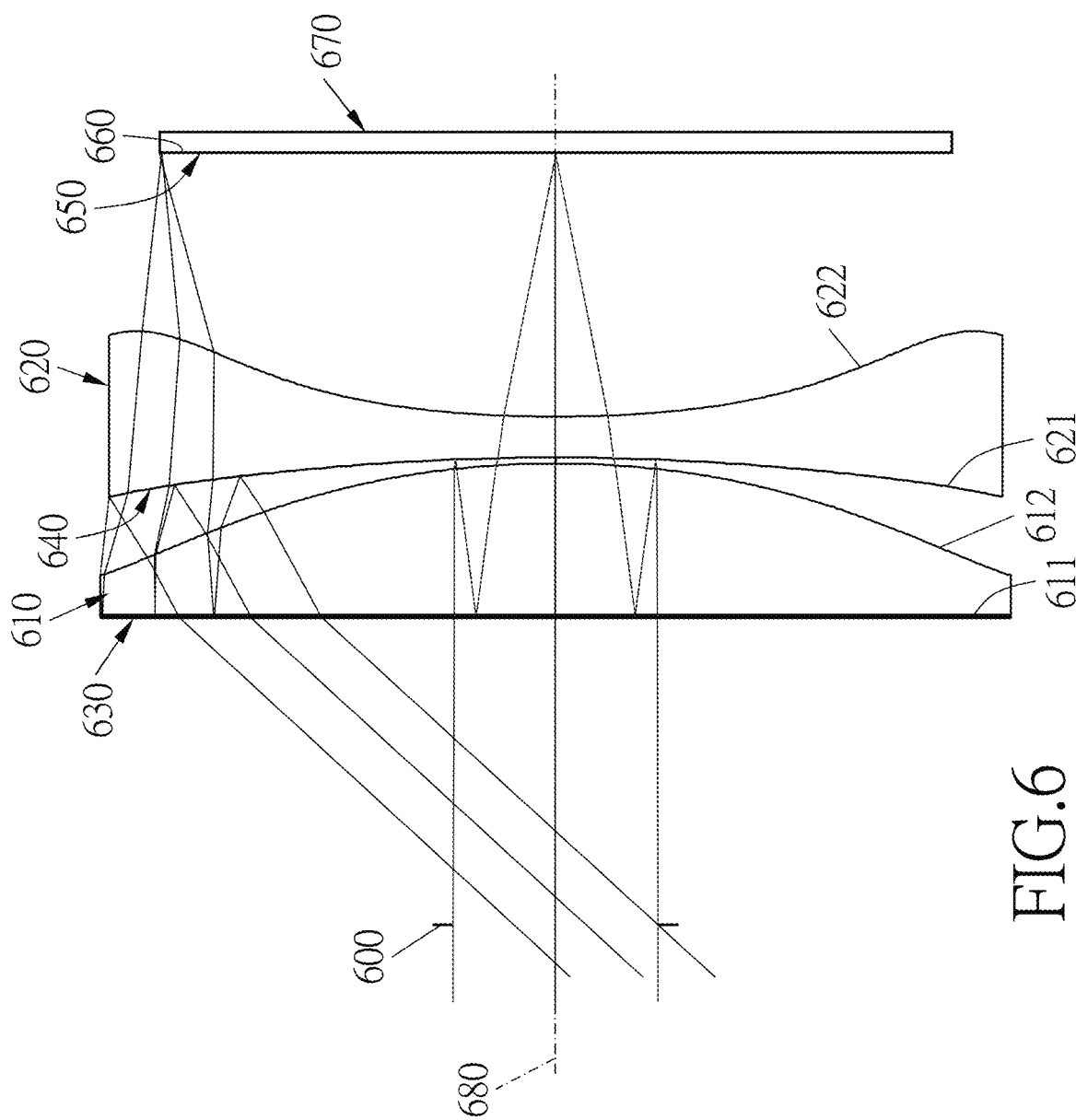
FIG. 6 is a schematic view of an optical lens assembly in accordance with a sixth embodiment of the present invention.

Referring to FIG. 6, an optical lens assembly in accordance with a sixth embodiment of the present invention includes, in order from a visual side to an image source side along an optical axis 680: a stop 600, an optical element 630, a first lens 610, a partial-reflective-partial-transmissive element 640, a second lens 620, a second phase retarder 650 and an image source plane 660. The optical lens assembly has a total of two lenses with refractive power, but not is limited thereto.

The stop 600 may be located in a position where the user's eyes view an image.

The first lens 610 with positive refractive power includes a visual-side surface 611 and an image source-side surface 612, the visual-side surface 611 of the first lens 610 is flat in a paraxial region thereof, the image source-side surface 612 of the first lens 610 is convex in a paraxial region thereof, the image source-side surface 612 of the first lens 610 is aspheric, and the first lens 610 is made of plastic.

The second lens 620 with negative refractive power includes a visual-side surface 621 and an image source-side surface 622, the visual-side surface 621 of the second lens 620 is concave in a paraxial region thereof, the image source-side surface 622 of the second lens 620 is concave in a paraxial region thereof, the visual-side surface 621 and the image source-side surface 622 of the second lens 620 are aspheric, and the second lens 620 is made of plastic.

The optical element 630 is located on the visual-side surface 611 of the first lens 610, and the configuration of the optical element 630 is the same as that of the optical element 130 of the first embodiment and will not be explained again.

The partial-reflective-partial-transmissive element 640 is located on the visual-side surface 621 of the second lens 620, and the configuration of the partial-reflective-partial-transmissive element 640 is the same as that of the partial-reflective-partial-transmissive element 140 of the first embodiment and will not be explained again.

The second phase retarder 650 is disposed on the image source plane 660, and the configuration of the second phase retarder 650 is the same as that of the second phase retarder 150 of the first embodiment and will not be explained again.

The optical lens assembly works in cooperation with an image source 670 disposed on the image source plane 660. The image source plane 660 is located between the second phase retarder 650 and the image source 670. In the present embodiment, the type of the image source 670 is, for example, but not limited to, a liquid crystal display, or may be an OLED display, a LED display, or other displays.

Please refer to Tables 21-24, Table 21 shows the detailed optical data of the elements of the optical lens assembly of the sixth embodiment, Table 22 shows the aspheric coefficients of the aspherical surfaces of the elements of the optical lens assembly of the sixth embodiment, Table 23 shows the remaining parameters of the optical lens assembly of the sixth embodiment and the values thereof, and the values of the parameters in Tables 21 and 23 meet the conditional formulas of Table 24. In the sixth embodiment, the equation of the aspheric surface profiles of the aforementioned lenses is the same as the equation of the aspheric surface profiles of the aforementioned lenses in the first embodiment. The definitions of the surfaces in Table 21 can be referred to the relevant description of Table 1 and will not be explained again.

TABLE 21

Embodiment 6
f = 25.62 mm, EPD(Entrance pupil diameter) = 10.00 mm, FOV (Field of view) = 95.00°

| Surface | | Radius of curvature | Thickness/ gap | Refractive Index (nd) | Abbe number (vd) | Refraction/ reflection |
|---|---|---|---|---|---|---|
| 0 | Stop | Infinity | 15.000 | — | — | — |
| 1 | Absorptive polarizer | Infinity | 0.100 | 1.533 | 56.0 | Refraction |
| 2 | Reflective polarizer | Infinity | 0.100 | 1.533 | 56.0 | Refraction |
| 3 | First phase retarder | Infinity | 0.100 | 1.533 | 56.0 | Refraction |
| 4 | First lens | Infinity | 7.303 | 1.544 | 55.9 | Refraction |
| 5 | | −45.888 | 0.300 | — | — | Refraction |
| 6 | Partial-reflective-partial-transmissive element | −119.067 | −0.300 | — | — | Reflection |
| 7 | | −45.888 | −7.303 | 1.544 | 55.9 | Refraction |
| 8 | First phase retarder | Infinity | −0.100 | 1.533 | 56.0 | Refraction |
| 9 | Reflective polarizer | Infinity | −0.100 | 1.533 | 56.0 | Refraction |
| 10 | Reflective polarizer | Infinity | 0.100 | 1.533 | 56.0 | Reflection |
| 11 | First phase retarder | Infinity | 0.100 | 1.533 | 56.0 | Refraction |
| 12 | First lens | Infinity | 7.303 | 1.544 | 55.9 | Refraction |
| 13 | | −45.888 | 0.300 | — | — | Refraction |
| 14 | Second lens | −119.067 | 2.000 | 1.635 | 23.4 | Refraction |
| 15 | | 65.096 | 12.813 | — | — | |
| 16 | Second phase retarder | Infinity | 0.100 | 1.533 | 56.0 | Refraction |
| 17 | Image source plane | Infinity | — | — | — | — |

The reference wavelength is 555 nm.

TABLE 22

Embodiment 6
Aspheric Coefficients

| Surface | 4, 8, 12 | 5, 7, 13 | 6, 14 | 15 |
|---|---|---|---|---|
| K: | 0.0000E+00 | 0.0000E+00 | 0.0000E+00 | 7.0107E+00 |
| A2: | 0.0000E+00 | 0.0000E+00 | 0.0000E+00 | 0.0000E+00 |
| A4: | 0.0000E+00 | −3.8303E−06 | 2.4045E−06 | 7.3068E−06 |
| A6: | 0.0000E+00 | 6.0108E−09 | −6.9298E−09 | 3.5412E−08 |
| A8: | 0.0000E+00 | 5.5135E−12 | 1.6458E−11 | −8.1041E−11 |
| A10: | 0.0000E+00 | 1.1351E−14 | −1.7224E−14 | −1.3596E−13 |
| A12: | 0.0000E+00 | −1.4586E−17 | −2.0401E−17 | −5.1178E−17 |
| A14: | 0.0000E+00 | −3.4842E−20 | −9.0465E−21 | 1.0034E−19 |
| A16: | 0.0000E+00 | 7.4968E−23 | 5.8017E−23 | 1.8696E−22 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

TABLE 23

Embodiment 6

| f1 [mm] | 84.60 | CT2 [mm] | 2.00 | TDP4 [mm] | 4.18 |
|---|---|---|---|---|---|
| f2 [mm] | −65.97 | CA2 [mm] | 22.28 | TL [mm] | 22.82 |
| CT1 [mm] | 7.30 | CA4 [mm] | 20.26 | BFL [mm] | 12.91 |
| T12 [mm] | 0.30 | TDP2 [mm] | 5.50 | IMH [mm] | 19.25 |

TABLE 24

Embodiment 6

| f*IMH/TL [mm] | 21.62 | R2/R4 | −0.70 | CA2/CT1 | 3.05 |
|---|---|---|---|---|---|
| CA2/TDP2 | 4.05 | R3/f2 | 1.80 | CA4/CT2 | 10.13 |
| IMH/f | 0.75 | R2/CT1 | −6.28 | f/f2 | −0.39 |
| f/f1 | 0.30 | BFL/CT2 | 6.46 | R2/R3 | 0.39 |
| f1/f2 | −1.28 | T12/BFL | 0.02 | R2/f1 | −0.54 |
| R3/R4 | −1.83 | CA4/TDP4 | 4.85 | R4/f2 | −0.99 |
| CT1/CT2 | 3.65 | — | | — | — |

Seventh Embodiment

Figure 7:
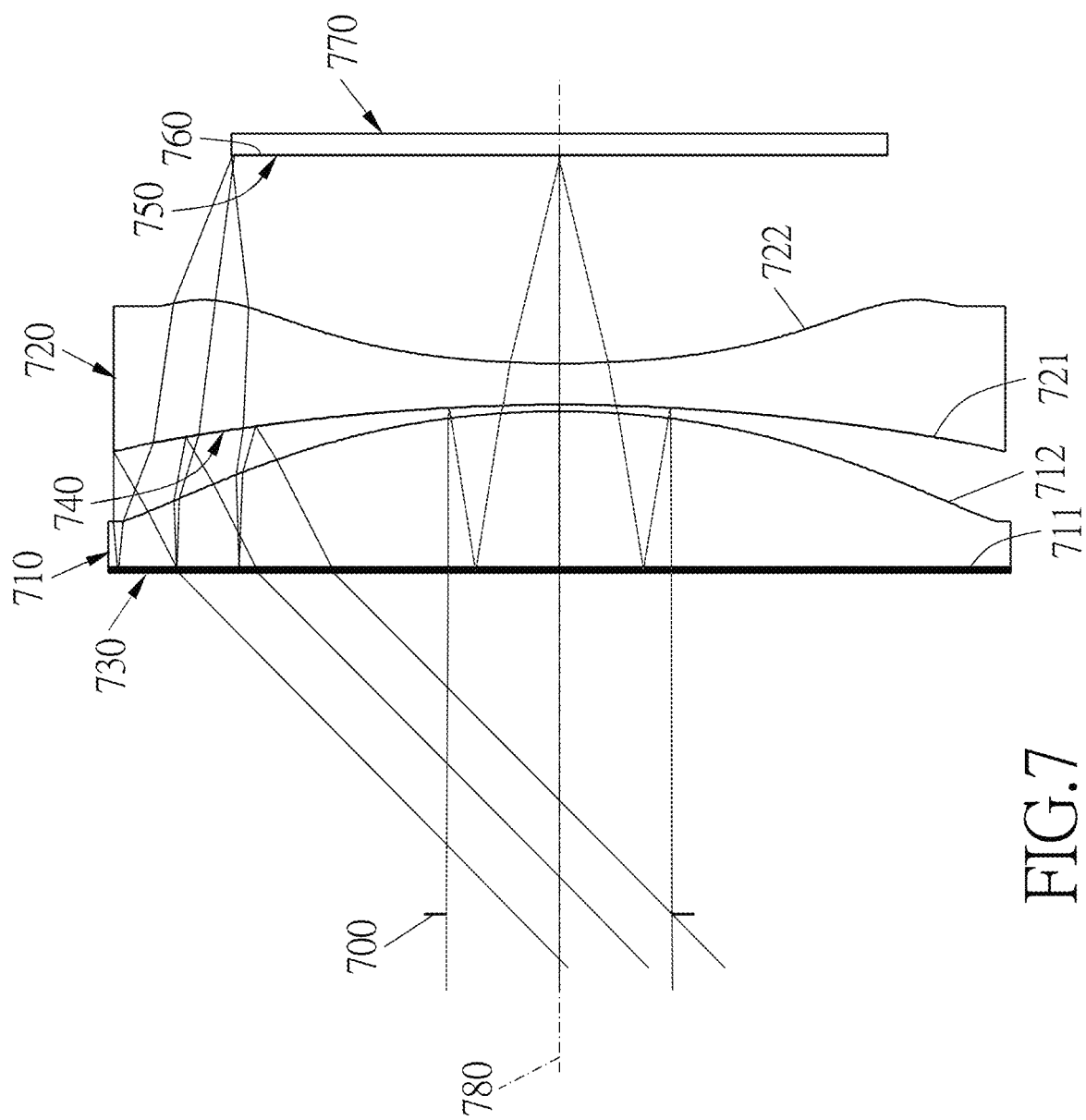
FIG. 7 is a schematic view of an optical lens assembly in accordance with a seventh embodiment of the present invention.

Referring to FIG. 7, an optical lens assembly in accordance with a seventh embodiment of the present invention includes, in order from a visual side to an image source side along an optical axis 780: a stop 700, an optical element 730, a first lens 710, a partial-reflective-partial-transmissive element 740, a second lens 720, a second phase retarder 750 and an image source plane 760. The optical lens assembly has a total of two lenses with refractive power, but not is limited thereto.

The stop 700 may be located in a position where the user's eyes view an image.

The first lens 710 with positive refractive power includes a visual-side surface 711 and an image source-side surface 712, the visual-side surface 711 of the first lens 710 is flat in a paraxial region thereof, the image source-side surface 712 of the first lens 710 is convex in a paraxial region thereof, the image source-side surface 712 of the first lens 710 is aspheric, and the first lens 710 is made of plastic.

The second lens 720 with negative refractive power includes a visual-side surface 721 and an image source-side surface 722, the visual-side surface 721 of the second lens 720 is concave in a paraxial region thereof, the image source-side surface 722 of the second lens 720 is concave in a paraxial region thereof, the visual-side surface 721 and the image source-side surface 722 of the second lens 720 are aspheric, and the second lens 720 is made of plastic.

The optical element 730 is located on the visual-side surface 711 of the first lens 710, and the configuration of the optical element 730 is the same as that of the optical element 130 of the first embodiment and will not be explained again.

The partial-reflective-partial-transmissive element 740 is located on the visual-side surface 721 of the second lens 720, and the configuration of the partial-reflective-partial-transmissive element 740 is the same as that of the partial-reflective-partial-transmissive element 140 of the first embodiment and will not be explained again.

The second phase retarder 750 is disposed on the image source plane 760, and the configuration of the second phase retarder 750 is the same as that of the second phase retarder 150 of the first embodiment and will not be explained again.

The optical lens assembly works in cooperation with an image source 770 disposed on the image source plane 760. The image source plane 760 is located between the second phase retarder 750 and the image source 770. In the present embodiment, the type of the image source 770 is, for example, but not limited to, a liquid crystal display, or may be an OLED display, a LED display, or other displays.

Please refer to Tables 25-28, Table 25 shows the detailed optical data of the elements of the optical lens assembly of the seventh embodiment, Table 26 shows the aspheric coefficients of the aspherical surfaces of the elements of the optical lens assembly of the seventh embodiment, Table 27 shows the remaining parameters of the optical lens assembly of the seventh embodiment and the values thereof, and the values of the parameters in Tables 25 and 27 meet the conditional formulas of Table 28. In the seventh embodiment, the equation of the aspheric surface profiles of the aforementioned lenses is the same as the equation of the aspheric surface profiles of the aforementioned lenses in the first embodiment. The definitions of the surfaces in Table 25 can be referred to the relevant description of Table 1 and will not be explained again.

TABLE 25

Embodiment 7
f = 21.09 mm, EPD(Entrance pupil diameter) = 10.00 mm, FOV (Field of view) = 89.97°

| Surface | | Radius of curvature | Thickness/ gap | Refractive index (nd) | Abbe number (vd) | Refraction/ reflection |
|---|---|---|---|---|---|---|
| 0 | Stop | Infinity | 15.000 | — | — | — |
| 1 | Absorptive polarizer | Infinity | 0.100 | 1.533 | 56.0 | Refraction |
| 2 | Reflective polarizer | Infinity | 0.100 | 1.533 | 56.0 | Refraction |
| 3 | First phase retarder | Infinity | 0.100 | 1.533 | 56.0 | Refraction |
| 4 | First lens | Infinity | 6.805 | 1.544 | 55.9 | Refraction |
| 5 | | −40.710 | 0.300 | — | — | Refraction |
| 6 | Partial-reflective-partial-transmissive element | −85.686 | −0.300 | — | — | Reflection |
| 7 | | −40.710 | −6.805 | 1.544 | 55.9 | Refraction |
| 8 | First phase retarder | Infinity | −0.100 | 1.533 | 56.0 | Refraction |
| 9 | Reflective polarizer | Infinity | −0.100 | 1.533 | 56.0 | Refraction |
| 10 | Reflective polarizer | Infinity | 0.100 | 1.533 | 56.0 | Reflection |
| 11 | First phase retarder | Infinity | 0.100 | 1.533 | 56.0 | Refraction |
| 12 | First lens | Infinity | 6.805 | 1.544 | 55.9 | Refraction |
| 13 | | −40.710 | 0.300 | — | — | Refraction |
| 14 | Second lens | −85.686 | 1.822 | 1.635 | 23.4 | Refraction |
| 15 | | 52.251 | 9.065 | — | — | — |
| 16 | Second phase retarder | Infinity | 0.100 | 1.533 | 56.0 | Refraction |
| 17 | Image source plane | Infinity | — | — | — | — |

The reference wavelength is 555 nm.

TABLE 26

Embodiment 7
Aspheric Coefficients

| Surface | 4, 8, 12 | 5, 7, 13 | 6, 14 | 15 |
|---|---|---|---|---|
| K: | 0.0000E+00 | 0.0000E+00 | 0.0000E+00 | 6.9557E+00 |
| A2: | 0.0000E+00 | 0.0000E+00 | 0.0000E+00 | 0.0000E+00 |
| A4: | 0.0000E+00 | −1.1737E−05 | 7.3764E−06 | 2.0249E−05 |
| A6: | 0.0000E+00 | 3.8623E−08 | −3.7781E−08 | 2.9560E−08 |
| A8: | 0.0000E+00 | 3.0028E−11 | 1.1115E−10 | −3.1269E−10 |
| A10: | 0.0000E+00 | −2.6423E−13 | −1.0329E−13 | −9.6812E−13 |
| A12: | 0.0000E+00 | 7.9848E−17 | −2.7350E−16 | −7.8011E−16 |
| A14: | 0.0000E+00 | 1.2889E−18 | 7.7779E−19 | 2.7864E−19 |
| A16: | 0.0000E+00 | −1.3447E−21 | −7.2671E−22 | 1.7164E−20 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

TABLE 27

Embodiment 7

| f1 [mm] | 75.05 | CT2 [mm] | 1.82 | TDP4 [mm] | 2.62 |
|---|---|---|---|---|---|
| f2 [mm] | −50.83 | CA2 [mm] | 19.89 | TL [mm] | 18.44 |
| CT1 [mm] | 6.80 | CA4 [mm] | 17.18 | BFL [mm] | 9.17 |
| T12 [mm] | 0.30 | TDP2 [mm] | 5.00 | IMH [mm] | 14.42 |

TABLE 28

Embodiment 7

| f*IMH/TL [mm] | 16.49 | R2/R4 | −0.78 | CA2/CT1 | 2.92 |
|---|---|---|---|---|---|
| CA2/TDP2 | 3.97 | R3/f2 | 1.69 | CA4/CT2 | 9.43 |
| IMH/f | 0.68 | R2/CT1 | −5.98 | f/f2 | −0.41 |
| f/f1 | 0.28 | BFL/CT2 | 5.03 | R2/R3 | 0.48 |
| f1/f2 | −1.48 | T12/BFL | 0.03 | R2/f1 | −0.54 |
| R3/R4 | −1.64 | CA4/TDP4 | 6.56 | R4/f2 | −1.03 |
| CT1/CT2 | 3.74 | — | | — | — |

Eighth Embodiment

Figure 8:
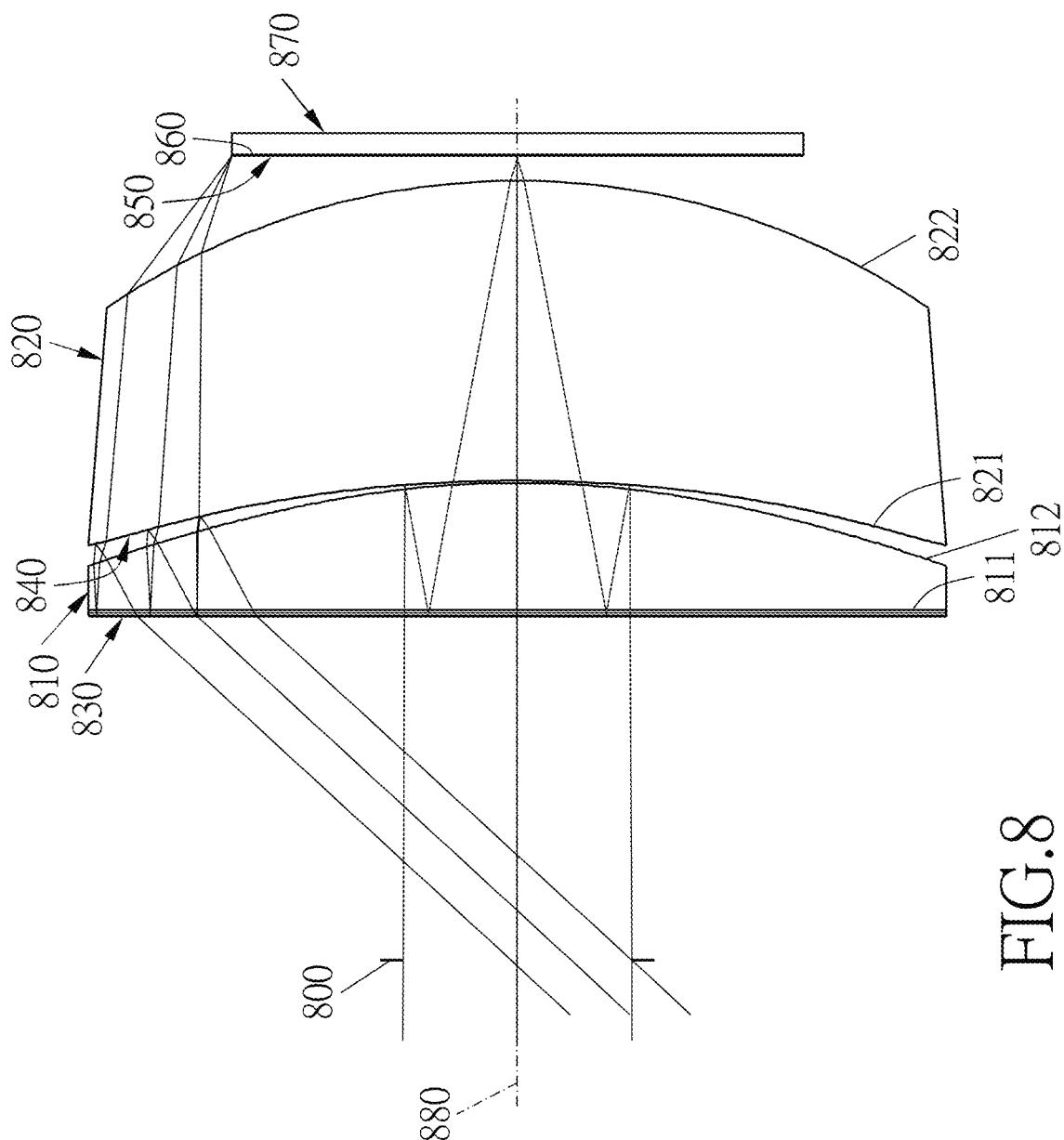
FIG. 8 is a schematic view of an optical lens assembly in accordance with an eighth embodiment of the present invention.

Referring to FIG. 8, an optical lens assembly in accordance with an eighth embodiment of the present invention includes, in order from a visual side to an image source side along an optical axis 880: a stop 800, an optical element 830, a first lens 810, a partial-reflective-partial-transmissive element 840, a second lens 820, a second phase retarder 850 and an image source plane 860. The optical lens assembly has a total of two lenses with refractive power, but not is limited thereto.

The stop 800 may be located in a position where the user's eyes view an image.

The first lens 810 with positive refractive power includes a visual-side surface 811 and an image source-side surface 812, the visual-side surface 811 of the first lens 810 is flat in a paraxial region thereof, the image source-side surface 812 of the first lens 810 is convex in a paraxial region thereof, the image source-side surface 812 of the first lens 810 is aspheric, and the first lens 810 is made of plastic.

The second lens 820 with positive refractive power includes a visual-side surface 821 and an image source-side surface 822, the visual-side surface 821 of the second lens 820 is concave in a paraxial region thereof, the image source-side surface 822 of the second lens 820 is convex in a paraxial region thereof, the visual-side surface 821 and the image source-side surface 822 of the second lens 820 are aspheric, and the second lens 820 is made of plastic.

The optical element 830 is located on the visual-side surface 811 of the first lens 810, and the configuration of the optical element 830 is the same as that of the optical element 130 of the first embodiment and will not be explained again.

The partial-reflective-partial-transmissive element 840 is located on the visual-side surface 821 of the second lens 820, and the configuration of the partial-reflective-partial-transmissive element 840 is the same as that of the partial-reflective-partial-transmissive element 140 of the first embodiment and will not be explained again.

The second phase retarder 850 is disposed on the image source plane 860, and the configuration of the second phase retarder 850 is the same as that of the second phase retarder 150 of the first embodiment and will not be explained again.

The optical lens assembly works in cooperation with an image source 870 disposed on the image source plane 860. The image source plane 860 is located between the second phase retarder 850 and the image source 870. In the present embodiment, the type of the image source 870 is, for example, but not limited to, a liquid crystal display, or may be an OLED display, a LED display, or other displays.

Please refer to Tables 29-32, Table 29 shows the detailed optical data of the elements of the optical lens assembly of the eighth embodiment, Table 30 shows the aspheric coefficients of the aspherical surfaces of the elements of the optical lens assembly of the eighth embodiment, Table 31 shows the remaining parameters of the optical lens assembly of the eighth embodiment and the values thereof, and the values of the parameters in Tables 29 and 31 meet the conditional formulas of Table 32. In the eighth embodiment, the equation of the aspheric surface profiles of the aforementioned lenses is the same as the equation of the aspheric surface profiles of the aforementioned lenses in the first embodiment. The definitions of the surfaces in Table 29 can be referred to the relevant description of Table 1 and will not be explained again.

TABLE 29

Embodiment 8
f = 16.75 mm, EPD(Entrance pupil diameter) = 10.00 mm, FOV (Field of view) = 95.00°

| Surface | | Radius of curvature | Thickness/ gap | Refractive index (nd) | Abbe number (vd) | Refraction/ reflection |
|---|---|---|---|---|---|---|
| 0 | Stop | Infinity | 15.000 | — | — | — |
| 1 | Absorptive polarizer | Infinity | 0.100 | 1.533 | 56.0 | Refraction |
| 2 | Reflective polarizer | Infinity | 0.100 | 1.533 | 56.0 | Refraction |
| 3 | First phase retarder | Infinity | 0.100 | 1.533 | 56.0 | Refraction |
| 4 | First lens | Infinity | 5.540 | 1.544 | 55.9 | Refraction |
| 5 | | −43.549 | 0.100 | — | — | Refraction |

TABLE 29-continued

Embodiment 8
f = 16.75 mm, EPD(Entrance pupil diameter) = 10.00 mm, FOV (Field of view) = 95.00°

| Surface | | Radius of curvature | Thickness/ gap | Refractive index (nd) | Abbe number (vd) | Refraction/ reflection |
|---|---|---|---|---|---|---|
| 6 | Partial-reflective- partial- transmissive element | −64.742 | −0.100 | — | — | Reflection |
| 7 | | −43.549 | −5.540 | 1.544 | 55.9 | Refraction |
| 8 | First phase retarder | Infinity | −0.100 | 1.533 | 56.0 | Refraction |
| 9 | Reflective polarizer | Infinity | −0.100 | 1.533 | 56.0 | Refraction |
| 10 | Reflective polarizer | Infinity | 0.100 | 1.533 | 56.0 | Reflection |
| 11 | First phase retarder | Infinity | 0.100 | 1.533 | 56.0 | Refraction |
| 12 | First lens | Infinity | 5.540 | 1.544 | 55.9 | Refraction |
| 13 | | −43.549 | 0.100 | — | — | Refraction |
| 14 | Second lens | −64.742 | 13.087 | 1.544 | 55.9 | Refraction |
| 15 | | −31.971 | 1.000 | — | — | — |
| 16 | Second phase retarder | Infinity | 0.100 | 1.533 | 56.0 | Refraction |
| 17 | Image source plane | Infinity | — | — | — | — |

The reference wavelength is 555 nm.

TABLE 30

Embodiment 8
Aspheric Coefficients

| Surface | 4, 8, 12 | 5, 7, 13 | 6, 14 | 15 |
|---|---|---|---|---|
| K: | 0.0000E+00 | −1.6923E+00 | 1.6502E+00 | 0.0000E+00 |
| A2: | 0.0000E+00 | 0.0000E+00 | 0.0000E+00 | 0.0000E+00 |
| A4: | 0.0000E+00 | 6.0801E−07 | −1.1926E−07 | 0.0000E+00 |
| A6: | 0.0000E+00 | 9.6340E−09 | −4.1075E−09 | 0.0000E+00 |
| A8: | 0.0000E+00 | 4.1777E−12 | 8.0426E−13 | 0.0000E+00 |
| A10: | 0.0000E+00 | −2.3616E−14 | 2.8831E−14 | 0.0000E+00 |
| A12: | 0.0000E+00 | −1.0400E−16 | 4.3928E−17 | 0.0000E+00 |
| A14: | 0.0000E+00 | −2.1405E−19 | −4.3383E−20 | 0.0000E+00 |
| A16: | 0.0000E+00 | 9.2958E−22 | 1.3548E−22 | 0.0000E+00 |
| A18: | 0.0000E+00 | 0.0000E+00 | 0.0000E+00 | 0.0000E+00 |
| A20: | 0.0000E+00 | 0.0000E+00 | 0.0000E+00 | 0.0000E+00 |

TABLE 31

Embodiment 8

| f1 [mm] | 79.57 | CT2 [mm] | 13.09 | TDP4 [mm] | 4.94 |
|---|---|---|---|---|---|
| f2 [mm] | 101.13 | CA2 [mm] | 18.56 | TL [mm] | 20.13 |
| CT1 [mm] | 5.54 | CA4 [mm] | 17.08 | BFL [mm] | 1.10 |
| T12 [mm] | 0.10 | TDP2 [mm] | 3.54 | IMH [mm] | 12.50 |

TABLE 32

Embodiment 8

| f*IMH/TL [mm] | 10.40 | R2/R4 | 1.36 | CA2/CT1 | 3.35 |
|---|---|---|---|---|---|
| CA2/TDP2 | 5.24 | R3/f2 | −0.64 | CA4/CT2 | 1.31 |
| IMH/f | 0.75 | R2/CT1 | −7.86 | f/f2 | 0.17 |
| f/f1 | 0.21 | BFL/CT2 | 0.08 | R2/R3 | 0.67 |
| f1/f2 | 0.79 | T12/BFL | 0.09 | R2/f1 | −0.55 |
| R3/R4 | 2.03 | CA4/TDP4 | 3.45 | R4/f2 | −0.32 |
| CT1/CT2 | 0.42 | — | | — | — |

For the optical lens assembly in the present invention, the lenses can be made of plastic or glass. If the lens is made of plastic, it is conducive to reducing the manufacturing cost. If the lens is made of glass, it is conducive to enhancing the degree of freedom in the arrangement of refractive power of the optical lens assembly.

For the optical lens assembly in the present invention, the aspheric surface can have any profile shape other than the profile shape of a spherical surface, so more variables can be used in the design of aspheric surfaces (than spherical surfaces), which is conducive to reducing the aberration and the number of lenses, as well as the total length of the optical lens assembly.

For the optical lens assembly in the present invention, if the surface shape of a respective lens surface of a respective lens with refractive power is convex and the location of the convex portion of the respective lens surface of the respective lens is not defined, the convex portion is typically located in a paraxial region of the respective lens surface of the respective lens. If the surface shape of a respective lens surface of a respective lens is concave and the location of the concave portion of the respective lens surface of the respective lens is not defined, the concave portion is typically located in a paraxial region of the respective lens surface of the respective lens.

For the optical lens assembly in the present invention, the maximum effective radius of the lens surface is usually a radius of the effective optical region of the lens surface (i.e., a region which is not subjected to any surface treatment or extinction processing or is not provided with any shade).

Figure 9:
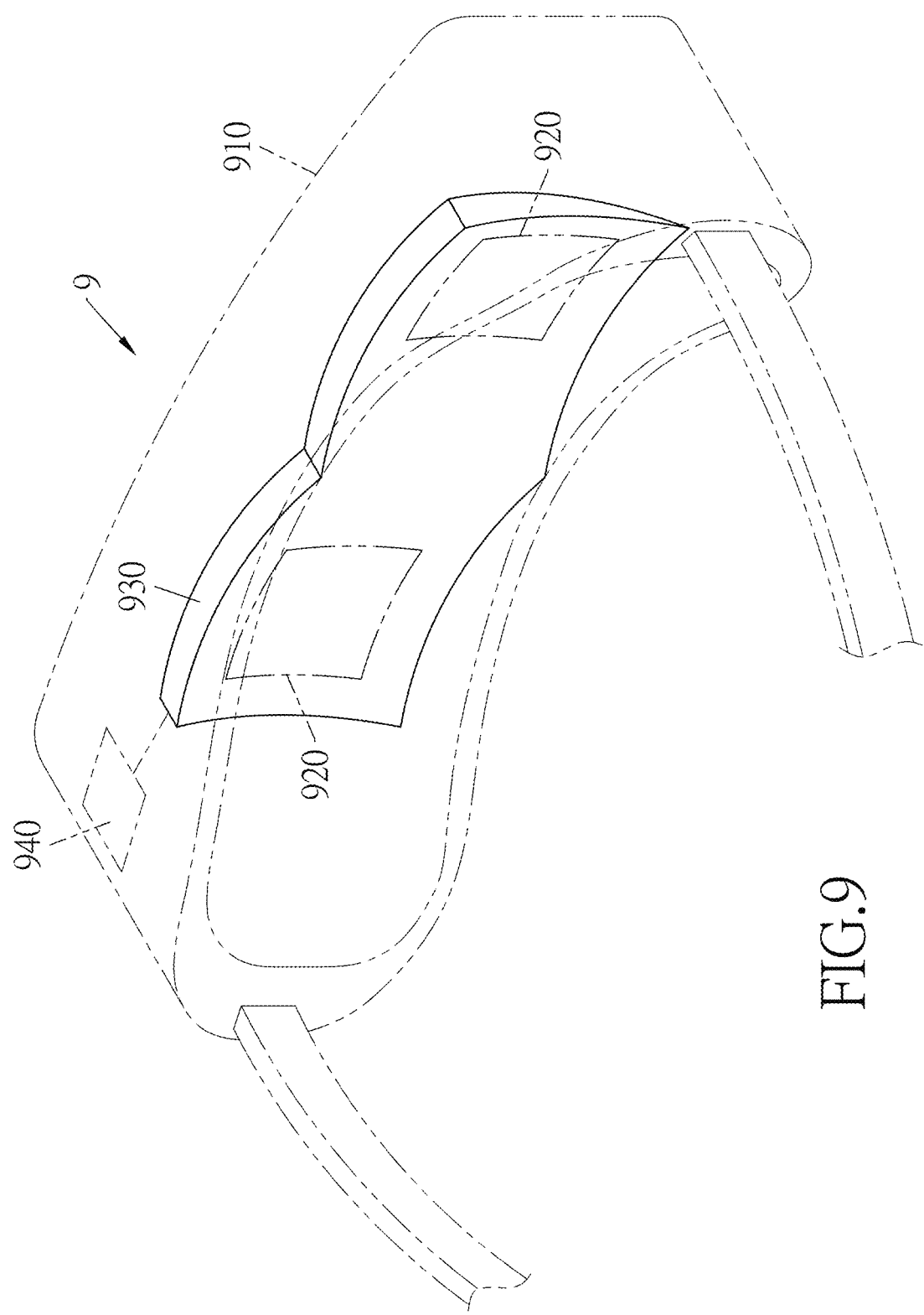
FIG. 9 is a schematic diagram of a head-mounted electronic device in accordance with an embodiment of the present invention.

The optical lens assembly of the present invention can be used in head-mounted electronic devices as required. FIG. 9 shows a head-mounted electronic device in accordance with an embodiment of the present invention. The head-mounted electronic device 9 is a head-mounted display device using, but not limited to, virtual reality (VR) technology, and includes a housing 910, an optical module 920, an image source 930 and a controller 940.

The optical module 920 corresponds to the left and right eyes of the user. The optical module 920 includes an optical lens assembly described in any one of the first to eighth embodiments.

The image source 930 can be an image source described in any one of the first to eighth embodiments. The image source 930 corresponds to the left and right eyes of the user, and the type of the image source 930 may be an OLED display, a LED display, a liquid crystal display, or other display, but is not limited thereto.

The controller 940 is electrically connected to the image source 930, so as to control the image source 930 to display an image, whereby the head-mounted electronic device 9 can project the image to the eyes of the user.

What is claimed is:

1. An optical lens assembly comprising, in order from a visual side to an image source side:
   an optical element comprising, in order from the visual side to the image source side: an absorptive polarizer, a reflective polarizer and a phase retarder;
   a first lens with refractive power, and an image source-side surface of the first lens being convex in a paraxial region thereof; and
   a second lens with refractive power, and a visual-side surface of the second lens being concave in a paraxial region thereof and provided with a partial-reflective-partial-transmissive element;
   wherein the optical lens assembly has a total of two lenses with refractive power, the optical element is disposed on a visual-side surface of the first lens, the optical element is disposed on a visual-side surface of the first lens, a focal length of the optical lens assembly is f, a maximum image source height of the optical lens assembly is IMH, a distance from a visual-side surface of the absorptive polarizer to an image source plane along an optical axis is TL, a radius of curvature of the image source-side surface of the first lens is R2, a thickness of the first lens along the optical axis is CT1, and the following conditional formulas are satisfied: 10.40 mm≤f*IMH/TL≤32.44 mm; and −11.00≤R2/CT1≤−3.03.

2. The optical lens assembly as claimed in claim 1, wherein the focal length of the optical lens assembly is f, the maximum image source height of the optical lens assembly is IMH, and the following conditional formula is satisfied: 0.68≤IMH/f≤0.86.

3. The optical lens assembly as claimed in claim 1, wherein the focal length of the optical lens assembly is f, a focal length of the first lens is f1, and the following conditional formula is satisfied: 0.18≤f/f1≤0.32.

4. The optical lens assembly as claimed in claim 1, wherein a maximum effective radius of the image source-side surface of the first lens is CA2, an absolute value of a displacement in parallel to the optical axis from an intersection between the image source-side surface of the first lens and the optical axis to a maximum effective radius position on the image source-side surface of the first lens is TDP2, and the following conditional formula is satisfied: 3.97≤CA2/TDP2≤6.32.

5. The optical lens assembly as claimed in claim 1, wherein a radius of curvature of the visual-side surface of the second lens is R3, a radius of curvature of an image source-side surface of the second lens is R4, and the following conditional formula is satisfied: −2.23≤R3/R4≤5.21.

6. The optical lens assembly as claimed in claim 1, wherein the thickness of the first lens along the optical axis is CT1, a thickness of the second lens along the optical axis is CT2, and the following conditional formula is satisfied: 0.42≤CT1/CT2≤3.74.

7. The optical lens assembly as claimed in claim 1, wherein the radius of curvature of the image source-side surface of the first lens is R2, a radius of curvature of an image source-side surface of the second lens is R4, and the following conditional formula is satisfied: −0.78≤R2/R4≤3.58.

8. The optical lens assembly as claimed in claim 1, wherein a focal length of the second lens is f2, a radius of curvature of the visual-side surface of the second lens is R3, and the following conditional formula is satisfied: −2.36≤R3/f2≤1.80.

9. The optical lens assembly as claimed in claim 1, wherein a distance from an image source-side surface of the second lens to the image source plane along the optical axis is BFL, a thickness of the second lens along the optical axis is CT2, and the following conditional formula is satisfied: 0.08≤BFL/CT2≤6.46.

10. The optical lens assembly as claimed in claim 1, wherein a distance from the first lens to the second lens along the optical axis is T12, a distance from an image source-side surface of the second lens to the image source plane along the optical axis is BFL, and the following conditional formula is satisfied: 0.02≤T12/BFL≤7.11.

11. The optical lens assembly as claimed in claim 1, wherein a maximum effective radius of the image source-side surface of the first lens is CA2, the thickness of the first lens along the optical axis is CT1, and the following conditional formula is satisfied: 1.61≤CA2/CT1≤4.55.

12. The optical lens assembly as claimed in claim 1, wherein a maximum effective radius of an image source-side surface of the second lens is CA4, a thickness of the second lens along the optical axis is CT2, and the following conditional formula is satisfied: 1.31≤CA4/CT2≤12.44.

13. A head-mounted electronic device, comprising:
    a housing;
    the optical lens assembly according to claim 1
    an image source disposed on the image source plane of the optical lens assembly in the housing; and
    a controller disposed in the housing and electrically connected to the image source.

14. The optical lens assembly as claimed in claim 1, wherein a maximum effective radius of an image source-side surface of the second lens is CA4, an absolute value of a displacement in parallel to the optical axis from an intersection between the image source-side surface of the second lens and the optical axis to a maximum effective radius position on the image source-side surface of the second lens is TDP4, and the following conditional formula is satisfied: 3.37≤CA4/TDP4≤25.86.

15. An optical lens assembly comprising, in order from a visual side to an image source side: an optical element comprising, in order from the visual side to the image source side: an absorptive polarizer, a reflective polarizer and a phase retarder; a first lens with refractive power, and an image source-side surface of the first lens being convex in a paraxial region thereof; and a second lens with refractive power, and a visual-side surface of the second lens being concave in a paraxial region thereof and provided with a partial-reflective-partial-transmissive element; wherein the optical lens assembly has a total of two lenses with refractive power, the optical element is disposed on a visual-side surface of the first lens, a focal length of the optical lens assembly is f, a maximum image source height of the optical lens assembly is IMH, a distance from a visual-side surface of the absorptive polarizer to the image source plane along an optical axis is TL, and the following conditional formula is satisfied: 10.40 mm≤f*IMH/TL≤32.44 mm.

* * * * *